(12) United States Patent
Maughan et al.

(10) Patent No.: US 10,810,286 B2
(45) Date of Patent: Oct. 20, 2020

(54) SYSTEMS AND METHODS FOR INTELLIGENTLY ACCESSING MEDIA CONTENT BASED ON RIGHTS

(71) Applicant: Rovi Guides, Inc., San Jose, CA (US)

(72) Inventors: Benjamin H. Maughan, Pleasanton, CA (US); Kevin B. Lenhart, Campbell, CA (US); Sean Matthews, Los Altos, CA (US)

(73) Assignee: ROVI GUIDES, INC., San Jose, CA (US)

( * ) Notice: Subject to any disclaimer, the term of this patent is extended or adjusted under 35 U.S.C. 154(b) by 220 days.

(21) Appl. No.: 15/960,977

(22) Filed: Apr. 24, 2018

(65) Prior Publication Data
US 2019/0325114 A1 Oct. 24, 2019

(51) Int. Cl.
*G06F 21/10* (2013.01)
*G06F 21/62* (2013.01)
*G06F 21/60* (2013.01)
*G06F 16/28* (2019.01)

(52) U.S. Cl.
CPC ............ *G06F 21/10* (2013.01); *G06F 16/284* (2019.01); *G06F 21/604* (2013.01); *G06F 21/6218* (2013.01); *G06F 2221/2141* (2013.01); *G06F 2221/2149* (2013.01)

(58) Field of Classification Search
CPC ...... G06F 21/10; G06F 16/284; G06F 21/604; G06F 21/6218; G06F 2221/2141
See application file for complete search history.

(56) References Cited

U.S. PATENT DOCUMENTS

| | | | |
|---|---|---|---|
| 6,239,794 | B1 | 5/2001 | Yuen |
| 6,564,378 | B1 | 5/2003 | Satterfield |
| 7,165,098 | B1 | 1/2007 | Boyer |
| 7,761,892 | B2 | 7/2010 | Ellis |
| 8,046,801 | B2 | 10/2011 | Ellis |
| 2002/0174430 | A1 | 2/2002 | Ellis |
| 2005/0251827 | A1 | 7/2005 | Ellis |
| 2007/0192300 | A1* | 8/2007 | Reuther .............. G06F 16/2471 |
| 2008/0132337 | A1* | 6/2008 | Lee .......................... A63F 13/77 463/42 |

(Continued)

OTHER PUBLICATIONS

Siddiki et al., "CrowdsouRS: A crowdsourced reputation system for identifying deceptive online contents," 2017 20th International Conference of Computer and Information Technology (ICCIT) Year: 2017 | Conference Paper | Publisher: IEEE.*

(Continued)

*Primary Examiner* — Roderick Tolentino
(74) *Attorney, Agent, or Firm* — Haley Guiliano LLP

(57) ABSTRACT

Systems and methods are provided for intelligently accessing media content based on rights. This may be accomplished by a media guidance application that generates a DRM score associated with a first copy of the media asset. The media guidance application determines that plurality of alternative copies of a media asset are available from other sources and determines DRM scores for the alternative copies. The media guidance application determines that one of the alternative copies has a lower digital rights management score as compared to the first copy of the media asset and stores the alternative copy instead of the first copy of the media asset.

20 Claims, 15 Drawing Sheets

(56) References Cited

U.S. PATENT DOCUMENTS

| | | | |
|---|---|---|---|
| 2008/0310734 A1* | 12/2008 | Ahammad | G06K 9/00711 |
| | | | 382/209 |
| 2009/0187951 A1* | 7/2009 | McCarthy | H04N 21/4334 |
| | | | 725/58 |
| 2010/0153885 A1 | 6/2010 | Yates | |
| 2011/0069940 A1 | 3/2011 | Shimy | |
| 2012/0079606 A1 | 3/2012 | Evans | |
| 2013/0061045 A1 | 3/2013 | Keifer | |
| 2014/0067935 A1* | 3/2014 | Hewinson | G06F 16/735 |
| | | | 709/204 |
| 2014/0258292 A1* | 9/2014 | Thramann | G06F 16/48 |
| | | | 707/736 |
| 2014/0282851 A1 | 9/2014 | Miller | |
| 2015/0046939 A1* | 2/2015 | Oliver | H04N 21/25875 |
| | | | 725/27 |
| 2017/0098086 A1* | 4/2017 | Hoernecke | G06Q 10/0635 |
| 2017/0187768 A1* | 6/2017 | Huang | H04L 67/2842 |
| 2018/0109587 A1* | 4/2018 | Spilka | H04L 65/4092 |

OTHER PUBLICATIONS

Xie et al., "Access Types Effect on Internet Video Services and Its Implications on CDN Caching," IEEE Transactions on Circuits and Systems for Video Technology Year: 2018 | vol. 28, Issue: 5 | Journal Article | Publisher: IEEE.*

* cited by examiner

SYSTEMS AND METHODS FOR INTELLIGENTLY ACCESSING MEDIA CONTENT BASED ON RIGHTS

BACKGROUND OF THE INVENTION

Users often subscribe to several media content providers. A subscriber may subscribe to a television programming service provider, e.g., companies like Comcast™, Verizon™, DirecTV™, or Dish Network™. In recent years, online streaming services, e.g., HBO Now™, Netflix™, and Amazon Prime™ Video, have become popular with media consumers. And users often subscribe to one or more online streaming services at the same time they subscribe to a television programming service including, at times, premium packages. Still other content sources, for example, online video sharing platforms like YouTube™, are available to users under free, ad-based, and subscription models. Each subscription service may provide video content to a subscriber with one or more access restrictions. Furthermore, media content from one service may be available on another service at the same time. And access restrictions on media content from one service may differ from the access restrictions for the same media content when made available from another service. Various systems exist for providing unified access to media content from a plurality of services. However, these systems are not effective to intelligently access media content available from multiple content providers based on access restrictions set by the service providers.

While media guidance applications may collect listings from multiple content providers to display consolidated listings of programs available from the service providers, current systems lack the functionality to track the access restrictions associated with each version of a program from each of the service providers. And users are often easily confused by the litany of digital rights management ("DRM") restrictions applied by a service provider on media content it provides. Current systems fail to adequately address the availability of the same media asset, e.g., the same episode of a television show, from more than one service provider to take into account different levels of access restrictions or DRM restrictions associated with each version of the media asset. A user may not appreciate that a different version of a media asset the user is accessing is available from another subscription the user maintains and may not appreciate that the other version of the media asset is associated with less access restrictions. Because current systems do not account for the access restrictions and DRM restrictions associated with media assets provided through program guides, the media guidance applications in current systems cannot assist users with accessing a version of a media asset that has the least amount of restrictions from among available options. In contrast, media guidance applications according to the embodiments disclosed herein can provide the user with several improvements for accessing different versions of media assets based on access restrictions placed on the media asset by different service providers. As described herein, a media guidance application according to embodiments disclosed may select an alternative version of a media asset from an alternative media source automatically for a user when the user requests access to the media asset from a given source. The alternative source may be selected because it is associated with a lower level of access restrictions than the originally selected version of the media asset. Thus, the media guidance application is able to minimize the impact of access restrictions on a user without causing additional confusion for the user based on complex intersections of different and competing access restrictions.

Additionally, because the media guidance application operates in full awareness of different versions of a media asset from different media sources and the associated access restrictions, the media guidance application can efficiently present the user with a user interface for accessing a preferred version of a media asset based on different access restrictions. In contrast, conventional systems are inefficient because a user would access a media asset from a media source without indication of the access restrictions associated with that version and would only learn of the restriction later, often at an inopportune time such as when the user attempts to access the media asset in a way that violates the access restriction. As a result, the overall experience of accessing media assets from different media sources is improved as well as ensuring the user can efficiently access a version of a media asset with the fewest access restrictions from several media sources.

SUMMARY

Accordingly, systems and methods for intelligently accessing media content available from multiple content providers based on access restrictions are provided herein. A media guidance application receives listings of media assets available from content providers to which a user subscribes and presents interactive guides to the user listing a consolidated list of media assets from several services.

The media guidance application receives a command from a user to store a copy of a media asset from a media source. For example, a user browsing the media guidance application may select an episode of a television show to store on a user device that is provided from a given media source, such as HBO. The media guidance application generates a DRM score associated with the user for the selected media asset from the media source. For example, the media guidance application may determine that HBO does not allow a user to access shows in an off-line mode and may generate an access restriction score to be used to compare against access restriction scores from other media sources.

In some embodiments, the media guidance application generates a DRM score according to the following process. The media guidance application determines DRM attributes that correspond with restrictions associated with the user for the media asset when accessed from the media source. For example, the media guidance application determines that a show has a digital rights management attribute that indicates whether connectivity is required to access the show. In other words, the media guidance application may access an attribute of a show that indicates that a user device must be connected to the Internet, online, in order to access the show. In some examples, the show may have several different attributes, e.g., required connectivity, geographic limits, virtual private networking allowed, allowed access devices, allowed access platforms, required subscription, paid access, free access, downloadable, and/or streamable. For each of the DRM attributes, the media guidance application obtains an attribute score corresponding to content of the DRM attribute. For example, the media guidance application may determine that a connectivity attribute indicating off-line access is allowed may be given a score of 0 while a connectivity attribute indicating that a device must be online to access the respective show may be given a score of 50. In this example, a higher score indicates higher level of restriction. The media guidance application may combine the plurality of attribute scores to generate the DRM score. As used herein, DRM attribute is used to describe any attribute of a source of a media asset or copy of a media asset that may be used to determine which of a several sources or copies of a media asset would be preferred or optimal for access by a user. While the principal example herein of DRM attributes are based on access restrictions, DRM attributes are not so limited and may further encompass the amount of commercials present in a source or copy, may encompass content attributes such as quality (e.g., standard definition, high definition, 4K), the presence of auxiliary information, the presence of 3D data, and may encompass the ability to time-shift or skip advertisements.

The media guidance application may determine that a plurality of alternative copies of the media asset are available from a plurality of alternative media sources to which the user subscribes. For example, a first streaming service, e.g., HBO Now, may provide access to content while at the same time a user may have access to the same content through another streaming service such as Amazon Prime or through access from traditional cable service. In some examples, the content may not be a one-to-one copy but may still be substantively similar content. For example, a show available from a cable operator may contain commercials while another version of the same show available from an online operator may not contain commercials or may contain different commercials.

The media guidance application generates a plurality of alternative DRM scores, each of the plurality of alternative DRM scores associated with the user for an alternative copy of the media asset from the plurality of alternative copies of the media asset. In a similar way to the manner in which the media guidance application determines a DRM score for the media asset as available from the media source from which the user initially requests storage of the media asset, the media guidance application may determine a DRM scores for each of the alternative sources.

The media guidance application determines that one of the plurality of alternative DRM scores indicates a lower level of access restrictions associated with the user for the media asset. For example, the media guidance application may determine that the user initially requested storage of a media asset from a media source that puts access restrictions on the media asset resulting in a DRM score of 75, but an alternative media source is available that puts different access restrictions on the media asset resulting in a DRM score of 25. Therefore, the media guidance application may determine that storage of the determined alternative copy of the media asset is preferred based on the comparison of the DRM scores for the two copies of the media asset. In response, the media guidance application responds to the user's initial command to store the media asset by retrieving and storing a copy of the media asset from the respective alternative media source without receiving an additional command from the user to store that copy of the media asset.

In some embodiments, the media guidance application may determine that a plurality of alternative copies of the media asset are available from alternative media sources by querying the alternative media sources. The media guidance application may determine an identifier associated with the media asset. For example, if the user selected a media asset such as season 6, episode 1 of "Game of Thrones" to be stored on a user device, the media guidance application may determine a simplistic unique id for the show as being GoT-S06-E01. In some embodiments, a system may exist for assigning globally unique identifiers ("GUID") to shows and the media guidance application may retrieve the GUID from metadata associated with the show or stored along with the program guide. The media guidance application may query the alternative media sources with the identifier and receive an indication from the alternative media sources of whether an alternative copy of the media asset is available from that alternative media source. For example, the media guidance application may send a message to a server associated with the media asset requesting whether the show is available from the media source for that user and may include the GUID in the request to accurately identify the show.

In some embodiments, the media guidance application determines DRM attributes for alternative copies by querying respective media sources. The media guidance application may identify one of the alternative media sources as being associated with a respective alternative copy of the media asset and query the identified media source and receive, in response, DRM attributes for the media asset if obtained from the identified media source. For example, the media guidance application may determine that Amazon Prime is an alternative source for obtaining a media asset, such as an episode of "Game of Thrones" and request, from an Amazon webserver, DRM attributes associated with the media asset. For example, the media guidance application may contact a web service using JavaScript Object Notation (JSON) formatted requests.

In some embodiments, the media guidance application determines DRM attributes for alternative copies of the media asset further by inferring the attributes from one or more attempted accesses. For example, the media guidance application may infer a DRM attribute for whether access from another geographic location is allowed by generating a request for the media asset that imitates access from another geographic location. The media guidance application may determine an access profile associated with one or more of the plurality of alternative DRM attributes. For example, the media guidance application may generate an access profile that imitates access from another country and imitates access from within a virtual private network. The media guidance application may transmit a message to a media source requesting retrieval of the media asset and use the determined access profile to make the request. The media guidance application may receive an indication from the media source of whether the alternative copy of the media asset is available using the determined access profile. Based on whether the media asset is available, the media guidance application may infer one or more DRM attributes. In some embodiments, the media guidance application may repeat several attempted accesses of the alternative copy of the media asset with different versions of the access profile to infer different DRM attributes.

In some embodiments, the media guidance application may further generate a user interface for managing attribute scores. For example, an informed user may prioritize the ability to watch a show in an off-line mode as opposed to the ability to watch a show in another geographic region. Therefore, the user may desire to give an online requirement attribute a relatively high score in comparison to a geographic region restriction attribute so that off-line copies of media assets are prioritized by the system's DRM scoring. In some embodiments, the media guidance application generates a user interface for managing attribute scores corresponding to content of digital rights management attributes. For example, the media guidance application may generate a screen of possible DRM attributes along with possible content for those attributes and corresponding scores. The media guidance application may generate user input elements in the interface to allow the user to input data in the interface. The media guidance application may receive attribute scores corresponding to content of DRM attributes and store the attribute scores in association with the corresponding content of the DRM attributes.

In some embodiments, the media guidance application further displays indications of DRM attributes of stored media assets in a user interface. The media guidance application may determine graphical indicators or textual indicators associated with DRM attributes of stored media assets. For example, a media asset that requires Internet connectivity for viewing may have an icon associated with the Internet, for example a Wi-Fi icon or RJ-45 network connector icon. The media guidance application may generate a user interface listing the stored media assets in association with the DRM attribute indicators. For example, the media guidance application may list the media asset in a guide with the associated icons next to the title of the media asset.

In some embodiments, the media guidance application may assign a weight to the attribute score corresponding to DRM attributes. For example, the media guidance application may determine that online versus off-line connectivity scores should have a 2× multiplier used in comparison to geographic restriction having a 1× multiplier. The media guidance application may determine a category for DRM attribute. For example, the DRM attribute may be an advertising-related attribute, a network-related attribute, or a playback-related attribute. Still other categories of attributes may exist, for example, time-related attribute. The media guidance application may determine a weight to apply to each attribute score based on its determined category. For example, the media guidance application may determine that a DRM attribute that limits playback to specific devices is given a greater weight than a DRM attribute that controls whether a user may skip advertisements.

In some embodiments, the media guidance application may monitor playback of a stored media asset to determine whether a DRM attribute of the media asset will prevent continued playback based on changing conditions and obtain another copy of the media asset that will allow continued playback of the media asset. The media guidance application may play back, on a wireless device, a copy of a media asset. During playback, the media guidance application may determine, for example, that the wireless device is approaching the edge of a geographic boundary associated with a geographic DRM attribute. For example, a media asset may be country-specific and a user may be travelling internationally. As the user approaches the border of a country, the media guidance application may recognize that the user will lose access to the media asset once the user reaches the border. The media guidance application may determine another copy of the media asset is available that is not associated with the geographic boundary. For example, the media guidance application may determine that it can access a copy of the media asset that can be viewed in a neighboring country. In some embodiments, the media guidance application may then access the media asset to allow the user to continue playback. In some embodiments, the media guidance application may determine where in the media asset the user is at in terms of viewing, i.e., the current playback point, and retrieve enough of the media asset to allow the user to continue playback from the current playback position. Once retrieved, the media guidance application may continue playback of the media asset whether or not the wireless communication device crosses the previously identified geographic boundary.

In some embodiments, the media guidance application may analyze media assets to determine how much time in the media asset is devoted to advertising and use that information in selecting versions of the media asset. The media guidance application may store a requested copy of the media asset from a selected media source. For example, the media guidance application may retrieve the copy of the media asset selected by the user in the media guidance application. The media guidance application may analyze the content of the that copy of the media asset to determine an amount of time associated with advertising content in the that copy of the media asset. For example, the media guidance application may identify vertical blanking as the start and end of a commercial or the media guidance application may access metadata that tracks the amount of time spent on advertising. The media guidance application may determine that the amount of time associated with advertising content in the copy of the media asset exceeds an advertising threshold. For example, the media guidance application may determine that the media asset is 5% commercials and an advertising threshold of 2% has been set. The media guidance application may modify the DRM attributes associated with the copy of the media asset to indicate that the amount of time associated with advertising content in the first copy of the media asset exceeds the advertising threshold. In accordance with the descriptions above, the media guidance application may use the advertising threshold attribute when computing the DRM score for that copy of the media asset.

In some embodiments, the media guidance application considers the time devoted to commercials in copies of media assets as a tie-breaker between similarly restricted copies of media assets. The media guidance application may identify at least two candidate alternative copies of the media asset associated with alternative digital rights management scores within a management score similarity threshold to one another. For example, the media guidance application may determine that the user issued a command to store a media asset from first provider, e.g., a copy of an episode of "Game of Thrones" being shown through the user's cable service. The media guidance application may also determine that show is available through a first streaming service, e.g., an HBO Now subscription, with a DRM score of 50 and also available through a second streaming service, e.g., the user's Amazon Prime subscription, with a DRM score of 55. The media guidance application may further determine that the scores are within a set threshold, e.g., 10 points, of one another. The media guidance application may determine an amount of time associated with advertising content in each of the candidate alternative copies of the media asset. For example, the media guidance application may determine that a show from the first streaming service contains 2 minutes of advertising while the same show from second streaming service contains 4 minutes of advertising. The media guidance application may then identify the candidate alternative copy of the media asset with the least amount of time associated with advertising content for retrieval and storage. Once the candidate alternative copy of the media asset with the least commercial time is identified, the media guidance application continues by retrieving and storing that copy of the media asset in place of the originally targeted copy of the media asset.

In some embodiments, the media guidance application determines attributes associated with the content of media assets from media sources to further determine which media source is optimal. For example, the media guidance application may determine the quality level of a media asset, e.g., standard definition, high definition, 4 k or may determine whether a media asset is for two-dimensional viewing versus three-dimensional viewing. The media guidance application may apply weights to the these determined attributes based on the importance of each attribute to the user in accordance to the methods described herein. As described with reference to weights applied to DRM attributes, the weights may be configurable by the user. The media guidance application may also use the scores applied to the attributes as a basis for the selection of an alternative media source. In some embodiments, the system described here may determine which of several alternative sources is optimal based on the determined attributes before determining DRM scores for the alternative source. In some embodiments, the system described here may determine which of several alternative sources is optimal based on the determined attributes after determining DRM scores for the alternative sources. In some embodiments, the system described here may determine which of several alternative sources is optimal based on the determined attributes without determining DRM scores for the alternative sources. In some embodiments a media guidance application may modify the DRM attributes associated with the media assets from alternative sources to include the attributes associated with the content of that media asset so that the attributes associated with the content influence the determination of the DRM score.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Accordingly, systems and methods for intelligently accessing media content available from multiple content providers based on access restrictions are provided herein. A media guidance application receives a listing of media assets available from content providers to which a user subscribes and presents interactive guides to the user listing a consolidated list of media assets from several services.

The media guidance application receives a command from a user to store a copy of a media asset from a particular media source. For example, a user browsing the media guidance application may select an episode of television show to store on a user device that is provided from a given media source, such as HBO. The media guidance application generates then compares the access restrictions, e.g., DRM restrictions, for that copy of the media asset with access restrictions on other available copies of the media asset from other content providers. If another copy of the media asset from another media provider has less onerous, or more preferential, access restrictions, the media guidance application makes a determination to retrieve and store the other copy of the media asset in place of the selected copy of the media asset.

Figure 1:
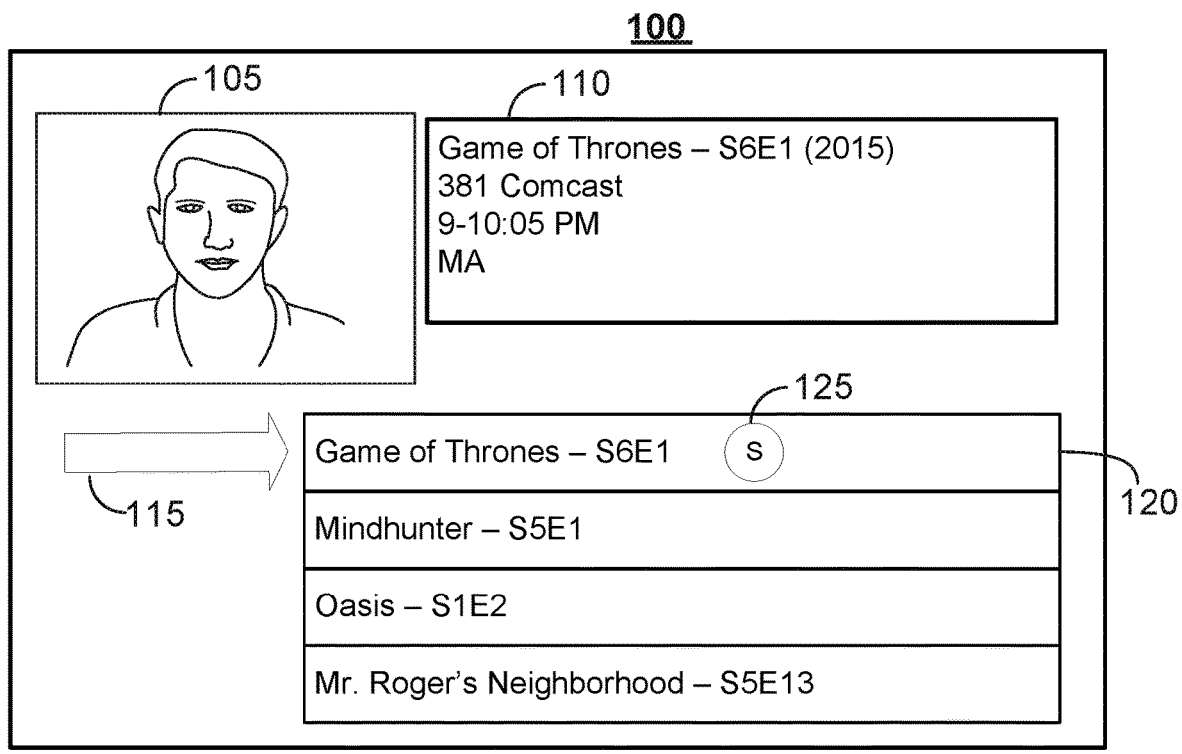
FIG. 1 depicts an illustrative embodiment of a display screen that may be used to select media assets for storage on a user device in accordance with some embodiments of the disclosure.

FIG. 1 depicts an illustrative embodiment of a display screen that may be used to select media assets for storage on a user device in accordance with some embodiments of the disclosure. FIG. 1 depicts an interface 100 for listing media assets in a media guidance application, which may be implemented on user equipment by control circuitry. The functionality of user equipment, control circuitry, and the media guidance application is described in further detail with respect to FIGS. 4-7.

In FIG. 1, the media guidance application in FIG. 1 provides access to linear and nonlinear content from multiple services providers to which an associated user subscribes. While generating the interface 100, the media guidance application may generate a region 105 for displaying an image that is content-related. The media guidance application may also display an information region 110 that displays information related to selected media assets. For example, the media guidance application may receive user input for selecting a media asset made available from a media source or service provider. In FIG. 1, an episode of "Game of Thrones" made available through Comcast cable service has been selected in grid 120 as indicated by cursor 115, and information region 110 displays textual information related to that content.

The media guidance application may receive a command from a user to store a copy of a media asset from a media source. For example, the media guidance application may receive a command from a user browsing the media guidance application in FIG. 1 to store an episode of "Game of Thrones" provided from Comcast cable. The command could be, for example, physical input received from a wireless communication device, a verbal command detected, a motion gesture, or an automated command sent via an application programming interface. In accordance with the disclosures herein, the media guidance application may respond to the command to store a copy of a media asset by determining that other copies of the media asset are available from multiple sources and making a determination of which copy to store based on access restrictions, e.g., DRM restrictions, on each available copy.

In some embodiments, the media guidance application may generate a DRM score associated with the user for the selected media asset from the media source. For example, the media guidance application may determine that HBO does not allow a user to access shows in an off-line mode and may generate an access restriction score to be used to compare against access restrictions from other media sources. The DRM score may be a numerical score calculated by the media guidance application to represent access restrictions placed on the user by an associated service provider, e.g., HBO, for accessing the media asset. Or the DRM score may be a qualitative representation, e.g., high, medium-high, medium, medium-low, or low, of access restrictions.

In some embodiments, the media guidance application generates a DRM score according to the following process. The media guidance application determines DRM attributes that correspond with restrictions associated with the user for the media asset when accessed from the media source. For example, the media guidance application determines that a show has a digital rights management attribute that indicates whether connectivity is required to access the show. In other words, the media guidance application may access an attribute of a show that indicates that a user device must be connected to the Internet, online, in order to access the show.

DRM and access restrictions may take on many forms. For example, DRM may limit the number of times a media asset may be played back, may limit for how long a media asset is stored on a device, may limit playback to authorized users, authorized devices, authorized platforms, may limit the quality of output, and/or may limit output to certified devices to prevent copying. DRM restrictions may be embedded directly into content, for example, media assets may have watermarks or metadata that indicate DRM or other access restrictions. DRM restrictions may require that a playback device is able to contact a management server. Still other restrictions may prevent a device from storing high-quality copies of a media asset and require that a device stores a lower-quality copy of a media asset on a storage device and then stream enhancement layers to elevate playback of the media asset into a higher-quality level. DRM restrictions may prevent playback of a media asset based on the network in which a device is located or based the geographic location of the devices. Still other DRM restrictions may limit playback of a media asset to specific days and times. DRM restrictions may require media assets be stored in an encrypted format. While these are some examples of possible DRM attributes corresponding with types of access restrictions, other types of DRM attributes could be employed and analyzed according to embodiments of the invention.

In some examples, the show may have several different attributes, e.g., required connectivity, geographic limits, virtual private networking allowed, allowed access devices, allowed access platforms. For each of the DRM attributes, the media guidance application may obtain an attribute score corresponding to content of the DRM attribute. For example, the media guidance application may determine that a connectivity attribute indicating that off-line access is allowed may be given a score of 0 while a connectivity attribute indicating that a device must be online to access the respective show may be given a score of 50. In this example, a higher score indicates higher level of restriction. The media guidance application may combine the plurality of attribute scores to generate the DRM score. For example, if three DRM attributes are present with scores of 0, 50, and 75, the combined DRM score may be combined to be 125. In another example, the media guidance application may normalize several DRM scores, for example, by taking an average of the DRM scores resulting, based on the numbers above, in a DRM score of 41.667. Still further, DRM scores may be weighted such that certain categories of DRM attributes are weighted more than other categories. For example, a user may have no need to access content in another country and would give geographic restrictions a low weight, and at the same time the user may desire to play back in an off-line mode and, therefore, the media guidance application would give connectivity restrictions a high weight. For example, the media guidance application may determine that online vs off-line connectivity scores should have a 2× multiple in comparison to geographic restriction. The media guidance application may determine a category for DRM attribute. For example, the DRM attribute may be an advertising related attribute, a network-related attribute, or a playback-related attribute. Still other categories of attributes may exist, for example, time-related attributes. The media guidance application may determine a weight to apply to the attribute score based on the determined category of the attribute. For example, the media guidance application may determine that a DRM attribute that limits playback to specific devices is given a greater weight than a DRM attribute of whether a user may skip advertisements. In the example where DRM scores are qualitative, the media guidance application may combine the scores by, for example, selecting the most extreme score from the plurality of scores, or the media guidance application may perform a subjective determination of the resulting combined score for the media asset.

In some embodiments, the media guidance application may weight DRM scores of certain DRM attributes based on the characteristics of a device associated with playback of the media assets. For example, if a device that is playing back the media assets is not capable of playing back 4K media then the media asset may give little or even no weight to attributes of media assets indicating a version of the asset is available in 4K. The media guidance application may, for example, retrieve a listing of a device's characteristics and determine with one or more of the DRM scores could be adjusted based on the device's characteristics. In some embodiments, the media guidance application may not consider an alternative copy of a media asset as available based on the device's characteristics. For example, if an alternative copy of a media asset is in 4K and the device is not capable of playing 4K content then the media guidance application may ignore that copy of the media asset. Other characteristics of the device may include: ability to play 3D content, whether the device is mobile or stationary, the speed of the device's network connection, whether a user has granted the device access to various service providers, the size of the display associated with the device, the quality of the display associated with the device, the memory and/or speed of the device. In some embodiments, the weighting of attributes based on a device's characteristics may be set by default. And in some embodiments, the media guidance application may allow a user to modify the weights used for attributes based on a device's characteristics as described above.

The media guidance application may determine that a plurality of alternative copies of the media asset are available from a plurality of alternative media sources to which the user subscribes. For example, HBO may provide access to HBO content directly, while at the same time a user may have access to HBO content through another service such as Amazon Prime or through access from traditional cable service. Using the example from FIG. 1, the media guidance application may receive a command to record season 6, episode 1 of "Game of Thrones" as provided by Comcast Cable (depicted in information region 110). In response to receiving that command, the media guidance application may determine that season 6, episode 1 of "Game of Thrones" is available from three content providers to which the user subscribes, e.g., HBO Now, Comcast cable, and Amazon Prime.

In some examples, the media guidance application may determine that two or more media assets are not one-to-one copies, but the media guidance application may still consider the media assets to be substantively similar content. For example, a show available from a cable operator may contain commercials while another version of the same show available from an online operator may not contain commercials or may contain different commercials.

In some embodiments, the media guidance application may generate a plurality of alternative DRM scores. Each of the plurality of alternative DRM scores would be associated with the user for an alternative copy of the media asset as made available from one of the alternative sources of the media asset. The alternative DRM scores may be determined in a manner as described above for determining a DRM score for the media asset as available from the media source from which the user initially requested storage. In some embodiments, the media guidance application may weight alternative DRM scores based on the associated media source.

In some embodiments, the media guidance application may determine that one of the plurality of alternative DRM scores indicates a lower level of access restrictions associated with the user for the media asset. For example, the media guidance application may determine that the user initially requested storage of a media asset from a media source that puts access restrictions on the media asset resulting in a DRM score of 75, but an alternative media source is available that puts different access restrictions on the media asset resulting in a DRM score of 25. Therefore, the media guidance application may determine that storage of the determined alternative copy of the media asset is preferred, based on the comparison of the DRM scores for the two copies of the media asset. In response, the media guidance application responds to the user's initial command to store the media asset by retrieving and storing a copy of the media asset from the respective alternative media source without receiving an additional command from the user to store that copy of the media asset.

Returning to the example of FIG. 1, during the determination of which version of the media asset, e.g., season 6, episode 1 of "Game of Thrones", the media guidance application will store, the media guidance application may determine that access restrictions associated with a first streaming service, e.g., HBO Now, are less onerous than restrictions put in place by a traditional cable operator, e.g., Comcast cable, and determine a lower DRM score for a copy of the media asset provided by the streaming service. In some embodiments, the media guidance application may determine that the streaming service provides the most optimal access restrictions according to criteria configured by the user. In response to this determination, the media guidance application may retrieve a media asset, e.g., season 6, episode 1 of "Game of Thrones", and store that copy of the media asset instead of storing a copy of the episode from the cable operator, e.g., Comcast. Furthermore, the media guidance application may indicate several sources are available and mark the version of the media asset that is stored and the version of the media asset that was determined to have the optimal access restriction; often these two would be the same media asset.

Figure 2:
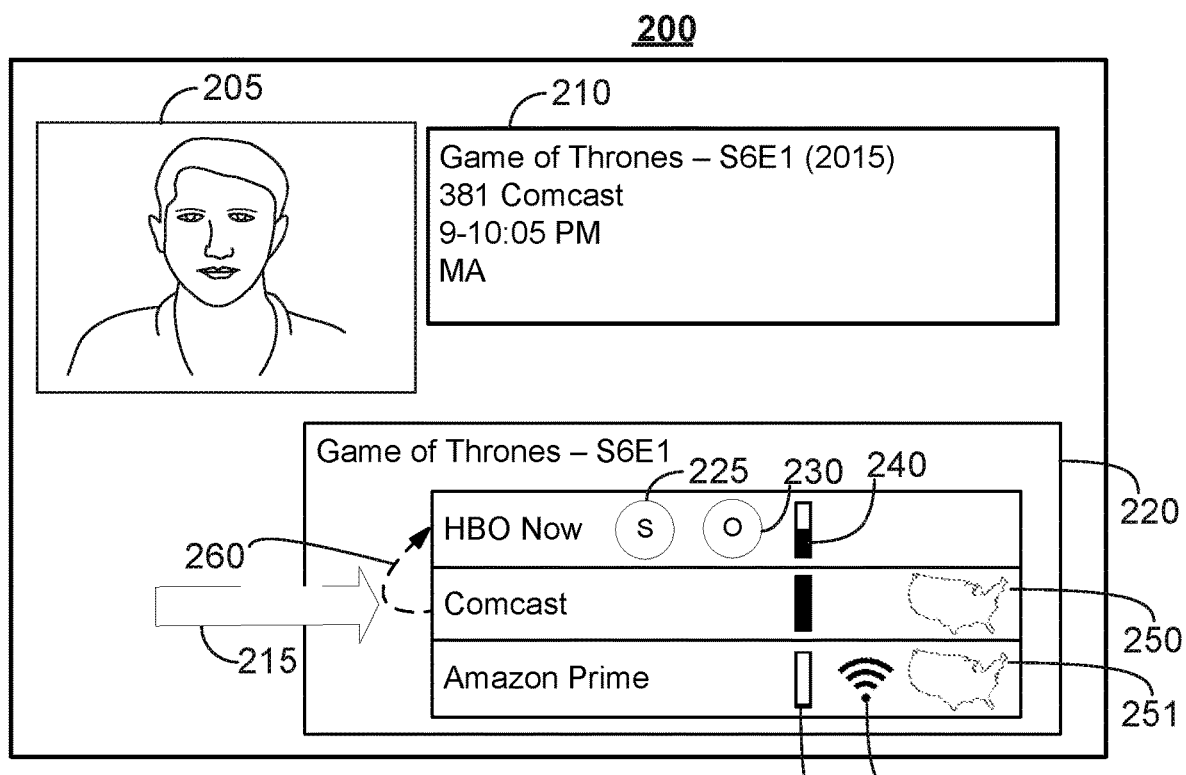
FIG. 2 depicts an illustrative embodiment of a display screen that may be used to select media assets associated with multiple media sources for storage on a user device in accordance with some embodiments of the disclosure.

For example, FIG. 2 depicts an illustrative embodiment of a display screen that may be used to select media assets associated with multiple media sources for storage on a user device in accordance with some embodiments of the disclosure. In FIG. 2, interface 200 includes list 220 that in which the order of the sources of the selected media assets has been rearranged in accordance with embodiments described herein. For example, the media guidance application determines that the media asset, season 6, episode 1 of "Game of Thrones", as provided by one of several content providers, in this example HBO Now, has the optimal DRM attributes for the user as determined in accordance with embodiments disclosed within. For example, as described with reference to FIG. 8 below. The listing of the optimal source, e.g., HBO Now, is indicted by arrow 260 as having moved from the second spot from the top of listing 220 to the top of listing 220 to emphasize that it is the optimal source. In some embodiments, the optimal source may be indicated by an optimal source indicator 230 as depicted in FIG. 2.

In some embodiments, as depicted in FIG. 2, a user may select a media asset, season 6, episode 1 of "Game of Thrones", as provided by a content provider, Comcast, for storage, as indicted by cursor 215. In accordance with the techniques described herein, the media guidance application determine to store the media asset, season 6, episode 1 of "Game of Thrones", as provided by a second content provider, HBO Now. Storage indicator 225 is generated in association with the media asset from the second content provider, HBO Now, in listing 220.

In some embodiments, the media guidance application may determine several DRM attributes of a media asset as provided by several content sources as described further below with reference to FIG. 9 and FIG. 10. The media guidance application may present icons that indicate DRM attributes in association with the source that provides the selected media asset with those attributes. DRM indicators 250 and 251 depict an image of the continental United States which may indicate that playback of the media asset is restricted, based on geography, to play back while a playback device is in the United States. DRM indicator 252 is associated with a connectivity DRM attribute. In the example of FIG. 2, the DRM indicator 252 depicts an image commonly associated with network connectivity which may indicate that Internet connectivity is required for playback of the media asset.

In some embodiments, the media guidance application may determine the amount of time associated with advertising content, e.g., the ad-load, in the media assets in accordance with embodiments herein. For example, FIG. 18 at step 1810, described below, describes techniques used to determine the ad-load on a media asset. The media guidance application may depict the ad-load of a media asset for each available source with a graphical depiction of the ad-load in the listing 220. For example, listing 220 contains an ad-load indication 240 in association with a first content source, e.g., HBO Now, that indicates a medium ad-load using a half full bar. List 220 also contains an ad-load indication 241 in association with a second content source, e.g., Amazon Prime, that indicate a low ad-load using an empty bar. In some embodiments, the ad-load may be depicted by a numerical value, e.g. 20 minutes, or by a percentage, e.g. 15% that corresponds with the determined amount of advertising in the media asset as provided by a source.

In some embodiments, the media guidance application determines that the plurality of alternative copies of the media asset are available from alternative media sources by querying the alternative media sources. The media guidance application may determine an identifier associated with the media asset. For example, if the user selects season 6 episode 1 of "Game of Thrones" to be stored on a user device, the media guidance application may determine a simplistic unique Id for the show as being GoT-S06-E01. In some embodiments, a system may exist for assigning globally unique identifiers ("GUID") to shows and the media guidance application may retrieve the GUID from metadata associated with the show or stored along with the program guide. Still further, the media guidance application may retrieve a copy of the media asset and identify a substantive portion of the media asset to use to generate a unique hash value of the content as the identifier to query alternative media sources.

In some embodiments, the media guidance application may query the alternative media sources with the identifier and receiving an indication from the alternative media sources of whether an alternative copy of the media asset is available from that alternative media source. For example, the media guidance application may send a message to a server associated with the media asset requesting whether the show is available from the media source for that user and may include the GUID in the request to accurately identify the show. For example, the media guidance application may contact a web service using JavaScript Object Notation (JSON) formatted requests. The media guidance application may, in some embodiments, may use an application programming interface ("API") call to query alternative media sources. In some embodiments, other computer messaging protocols may be used to query alternative media sources.

In some embodiments, the media guidance application determines DRM attributes for alternative copies by querying a respective media source. The media guidance application may identify one of the alternative media sources as being associated with the respective alternative copy of the media asset and query the identified media source and receive, in response, DRM attributes for the media asset if obtained from the identified media source. For example, the media guidance application may determine that an alternative source, e.g., Amazon Prime, for obtaining a media asset, e.g., an episode of "Game of Thrones", and request, from an Amazon webserver, DRM attributes associated with the media asset.

In some embodiments, the media guidance application determines DRM attributes for alternative copies of the media asset further by inferring the attributes from one or more attempted accesses. For example, the media guidance application may infer a DRM attribute for whether access from another geographic location is allowed by generating request for the media asset that imitates access from another geographic location. The media guidance application may determine an access profile associated with one or more of the plurality of alternative DRM attributes. For example, the media guidance application may generate an access profile that imitates access from another country and imitates access from within a virtual private network. The media guidance application may transmit a message to the media source requesting retrieval of the media asset and use the determined access profile to make the request. The media guidance application may receive an indication from the media source of whether the alternative copy of the media asset is available using the determined access profile. Based on whether the media asset is available, the media guidance application may infer one or more DRM attributes. In some embodiments, the media guidance application may repeat several attempted accesses of the alternative copy of the media asset with different versions of the access profile to infer different DRM attributes.

In some embodiments, the media guidance application may further generate a user interface for managing attribute scores. For example, an informed user may prioritize the ability to watch a show in an off-line mode as opposed to the ability to watch a show in another geographic region. Therefore, the user may desire to give an online requirement attribute a relatively high score in comparison to geographic region restriction attribute so that the off-line copies of media assets are prioritized by the system's DRM scoring. In some embodiments, the media guidance application generates a user interface for managing attribute scores corresponding to content of digital rights management attributes. For example, the media guidance application may generate a screen of possible DRM attributes along with possible content for those attributes and corresponding scores and generate the management interface in interface 100 of FIG. 1. The media guidance application may generate user input elements in the interface to allow the user to input data in the interface. The media guidance application may receive attribute scores corresponding to content DRM attributes and store the attribute scores in association with the corresponding content of the DRM attributes. In some embodiments, the DRM score management interface further groups DRM attributes in categories and provides a mechanism to allow a user to weight categories of DRM attributes. In some embodiments, the media guidance application provides an interface that allows a user to create and manage the categories by, for example, moving attributes from one DRM category to another DRM category. This customization provides several improvements. For example, displaying a vast array of DRM attributes and values may be confusing. Separating the attributes into categories may allow the media guidance application to more efficiently display those attributes by displaying individual categories one at a time, e.g., with separate tabs. Furthermore, the user is able to group DRM attributes into categories based on the user's priorities and give different weights to different categories of DRM attributes. This allows the system to take into account entire groups of high-priority DRM attributes versus low-priority DRM attributes. Moreover, because fewer DRM attributes can be shown in a given screen, the media guidance application may generate additional information related to the displayed DRM attributes.

In some embodiments, the media guidance application further generates, for display, indications of DRM attributes of stored media assets in a user interface. In some embodiments, the media guidance application may determine graphical indicators or textual indicators associated with DRM attributes of stored media assets. For example, a media asset that requires Internet connectivity for viewing may have an icon associated with the Internet, for example a Wi-Fi icon or RJ-45 network connector icon. The media guidance application may generate a user interface listing the stored media assets in association with the DRM attribute indicators. For example, the media guidance application may list the media asset in a guide with the associated icons next to the title of the media asset.

Figure 3:
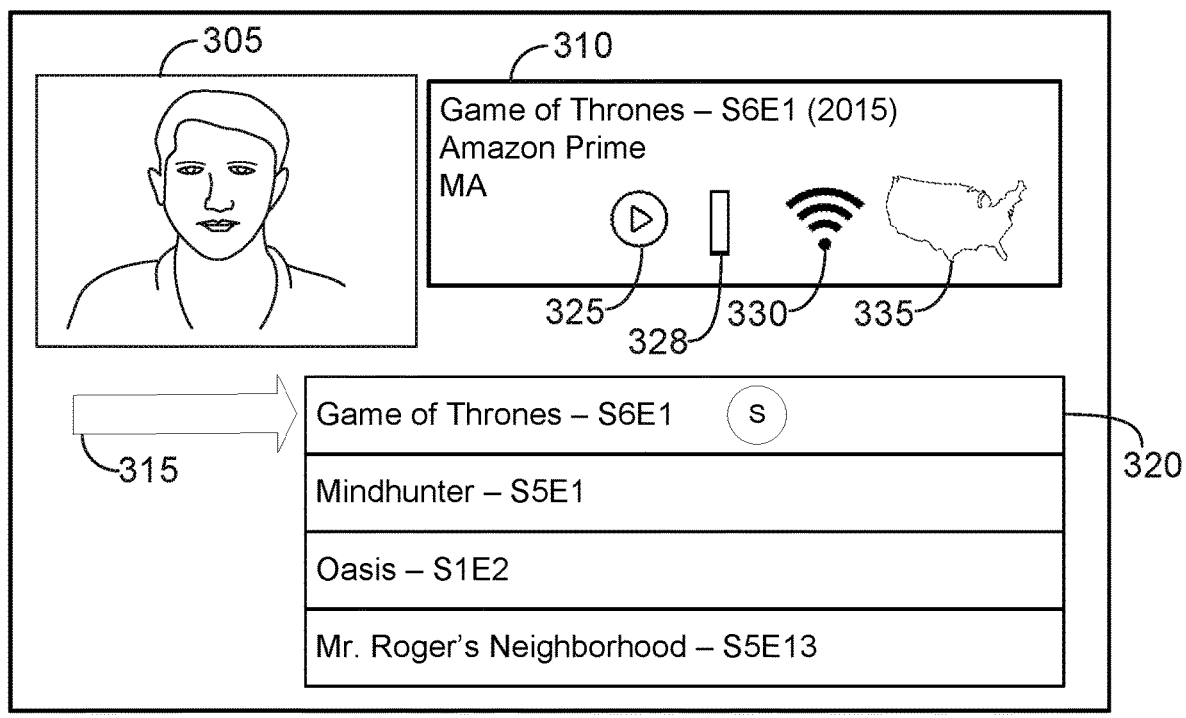
FIG. 3 depicts an illustrative embodiment of a display screen that may be used to display DRM attributes associated with a stored media asset in accordance with some embodiments of the disclosure.

FIG. 3 depicts an illustrative embodiment of a display screen that may be used to display DRM attributes associated with a stored media asset in accordance with some embodiments of the disclosure. In FIG. 3, information region 310 displays information associated with season 6, episode 1 of "Game of Thrones", which has been saved on a user device and selected in interface 300 as indicated by cursor 315. Information region 310 includes a playback interface element 325, one indicator associated with ad-load, and two indicators associated with DRM attributes. The information region 310 contains an ad-load indication 328 in association with the content source, e.g., Amazon Prime, that indicate a low ad-load using an empty bar. DRM indicator 330 is associated with a connectivity DRM attribute. In the example of FIG. 3, the DRM indicator 330 depicts an image commonly associated with network connectivity which may indicate that Internet connectivity is required for playback of the media asset. DRM indicator 335 depicts an image of the continental United States which may indicate that playback of the media asset is restricted, based on geography, to play back while a playback device is in the United States.

In some embodiments, the media guidance application may monitor playback of a stored media asset to determine whether a DRM attribute of the media asset will prevent continued playback based on changing conditions and obtain another copy of the media asset that will allow continued playback of the media asset. The media guidance application may play back, on a wireless device, a copy of a media asset. During playback, the media guidance application may determine, for example, that the wireless device is approaching the edge of a geographic boundary associated with a geographic DRM attribute. For example, a media asset may be country-specific, i.e., the media asset may have a regional playback restriction, and a user may be travelling internationally. As the user approaches the border of a country, the media guidance application may recognize that the user will lose access to the media asset once the user reaches the border. The media guidance application may determine another copy of the media asset is available that is not associated with the geographic boundary. For example, the media guidance application may determine that it can access a copy of the media asset that can be viewed in a neighboring country. The media guidance application may then determine where in the media asset the user is at in terms of viewing, i.e., the current playback point, and retrieve enough of the media asset to allow the user to continue playback from the current playback position. Once retrieved, the media guidance application may continue playback of the media asset whether or not the wireless communication device crosses the previously identified geographic boundary.

In some embodiments, the media guidance application may analyze media assets to determine how much time in the media asset is devoted to advertising and use that information in selecting versions of the media asset. The media guidance application may store a requested copy of the media asset from a selected media source. For example, the media guidance application may retrieve the copy of the media asset selected by the user in the media guidance application. The media guidance application may analyze the content of the that copy of the media asset to determine an amount of time associated with advertising content in that copy of the media asset. For example, the media guidance application may identify vertical blanking as the start and end of a commercial or the media guidance application may access metadata that tracks the amount of time spent on advertising. The media guidance application may determine that the amount of time associated with advertising content in the copy of the media asset exceeds an advertising threshold. For example, the media guidance application may determine that the media asset is 5% commercials and an advertising threshold of 2% has been set. The media guidance application may modify the DRM attributes associated with the copy of the media asset to indicate that the amount of time associated with advertising content in the first copy of the media asset exceeds the advertising threshold. In accordance with the descriptions above, the media guidance application may use the advertising threshold attribute when computing the DRM score for that copy of the media asset.

In some embodiments, the media guidance application considers the time devoted to commercials in copies of media assets as a tie-breaker between similarly restricted copies of media assets. The media guidance application may identify at least two candidate alternative copies of the media asset associated with alternative digital rights management scores within a management score similarity threshold to one another. For example, the media guidance application may determine that the media guidance application received a command to store a copy of an episode of "Game of Thrones" being shown through the user's cable service. The media guidance application may also determine that media asset is available through a first streaming server, e.g., the user's HBO Now subscription, with a DRM score of 50, and also available through a second streaming service, e.g., the user's Amazon Prime subscription, with a DRM score of 55. The media guidance application may further determine that the scores are within a set threshold, e.g., 10 points, of each another. The media guidance application may determine an amount of time associated with advertising content in each of the candidate alternative copies of the media asset. For example, the media guidance application may determine that the media asset from the first streaming service contains 2 minutes of advertising while the same show from the second streaming service contains 4 minutes of advertising. The media guidance application may then identify the candidate alternative copy of the media asset with the least amount of time associated with advertising content for retrieval and storage.

As used herein, "score similarity threshold" is defined to mean an amount as between two DRM scores such that the two DRM scores are considered similar by the media guidance application. In some embodiments, the control circuitry may be hardcoded with a score similarity threshold. In other embodiments, the control circuitry may store a modifiable score similarity threshold. The control circuitry may also retrieve a score similarity threshold from an external source; e.g., a user profile stored on a remote server may contain the subscription maintenance threshold. Further, the control circuitry may allow the subscriber to configure the score similarity threshold, e.g., the control circuitry may provide a user interface for setting the score similarity threshold.

As noted above, the media guidance application described herein controls storage media assets, particularly in response to receiving a command to store a media asset from a user. The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as online applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 4K, 3D, etc.), on-demand information, blogs, websites, and any other type of guidance data that is helpful for a user to navigate among and locate desired content selections.

Figure 4:
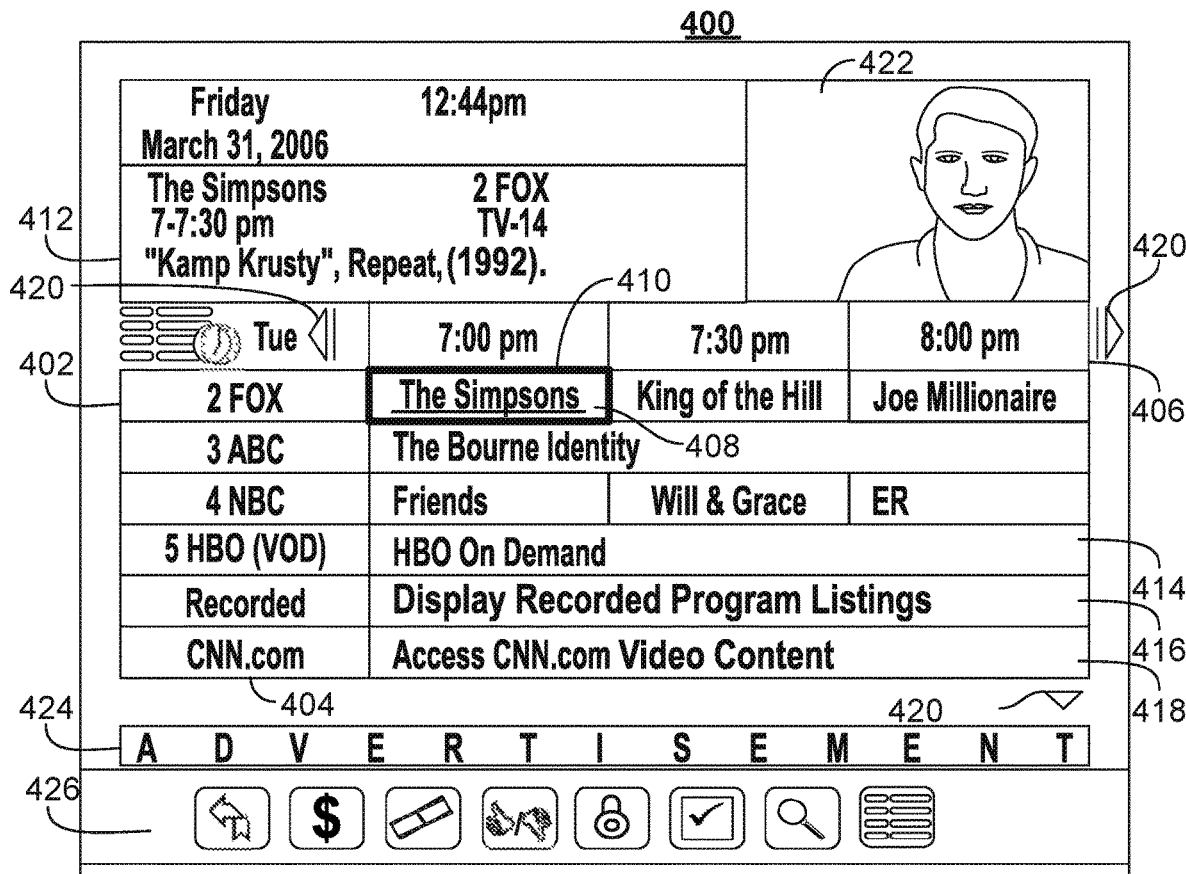
FIG. 4 shows an illustrative embodiment of a display screen that may be used to provide media guidance application listings and other media guidance information, in accordance with some embodiments of the disclosure.
Figure 5:
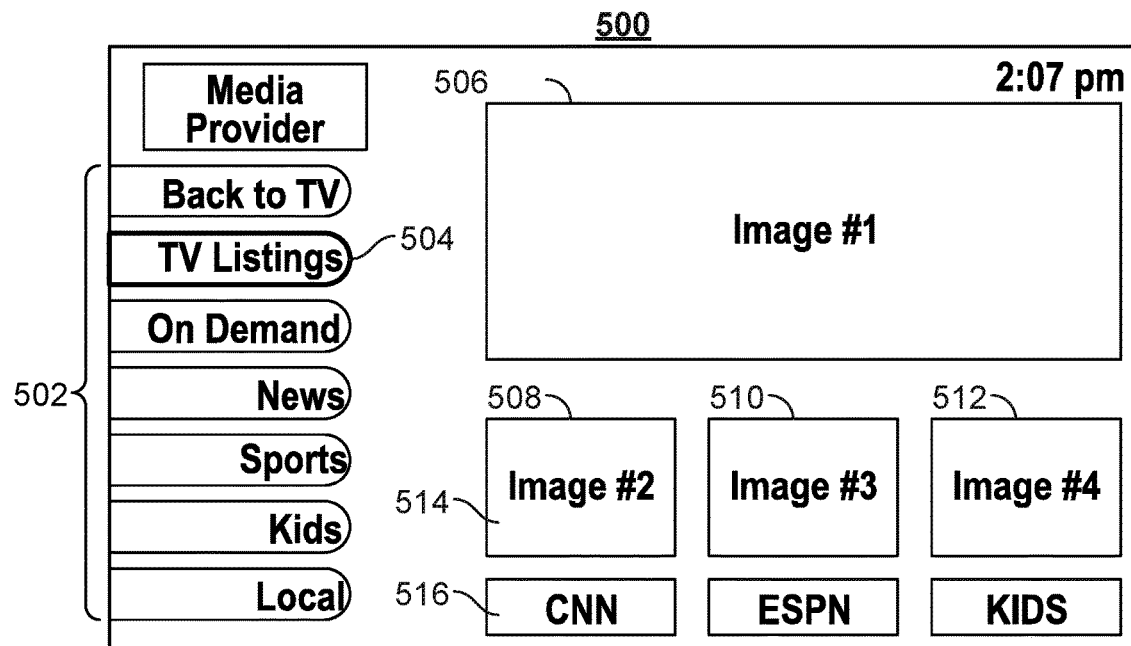
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to nonlinear programming (e.g., content accessible to a user equipment device at any time and is not provided according to a schedule). Nonlinear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 402 may provide media guidance data for nonlinear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV, only 4K, or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
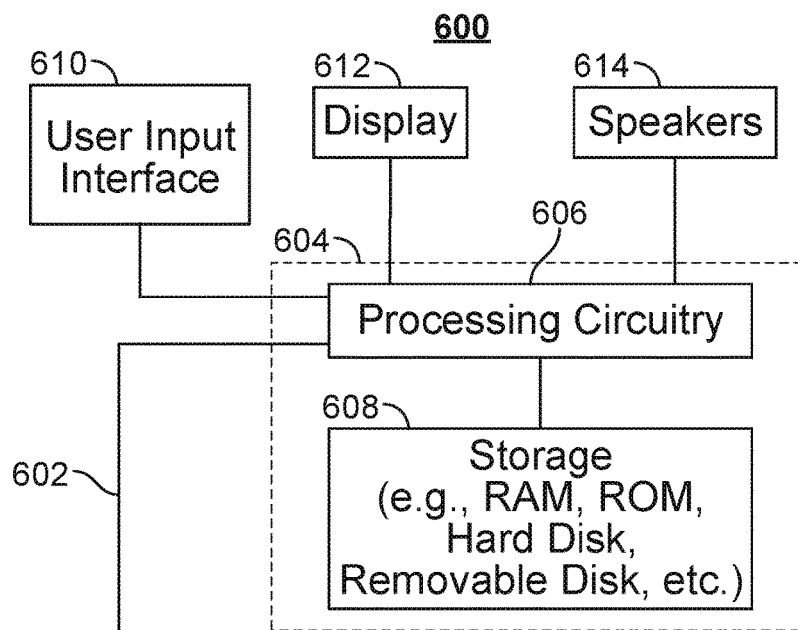
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable or 4K-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
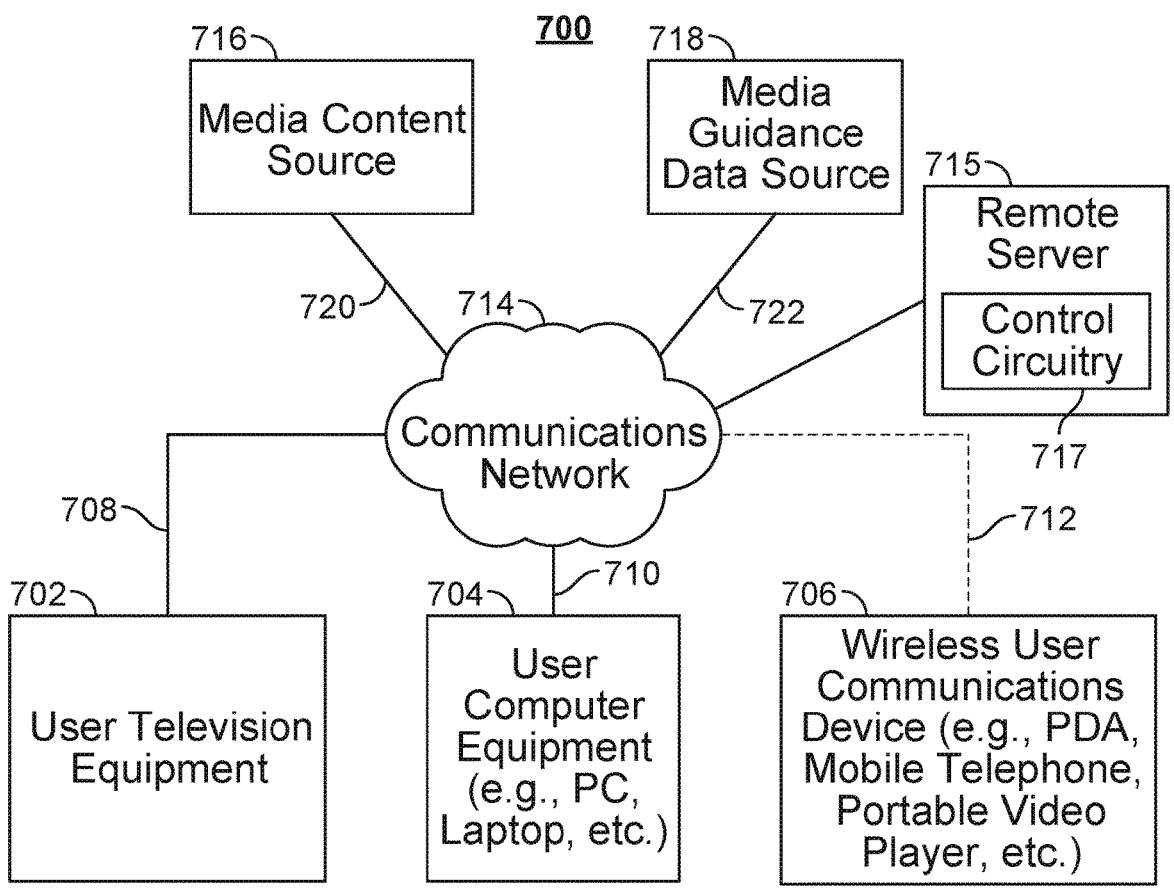
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
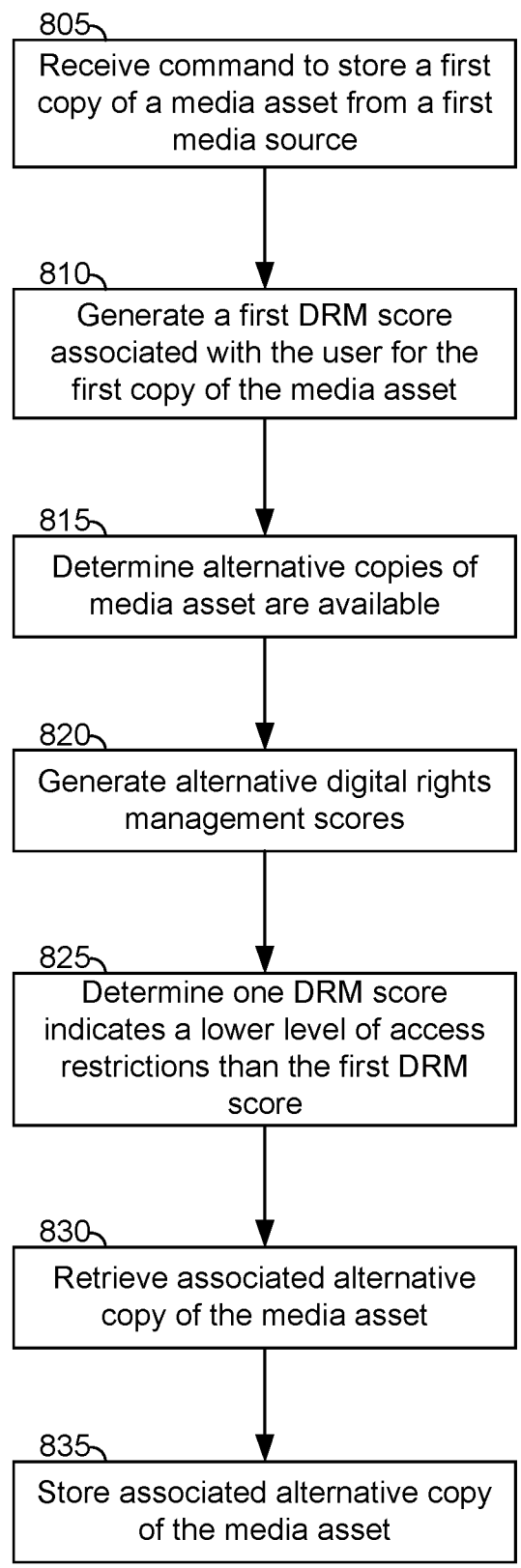
FIG. 8 depicts an illustrative flowchart of a process for intelligently accessing media content available from multiple content providers based on access restrictions, in accordance with some embodiments of the disclosure.

FIG. 8 depicts an illustrative flowchart of a process for intelligently accessing media content available from multiple content providers based on access restrictions, in accordance with some embodiments of the disclosure. It should be noted that process 800 or any step thereof could be performed on, or provided by, any of the devices shown in FIGS. 6-7. For example, process 800 may be executed by control circuitry 604 (FIG. 6) as instructed by a media guidance application implemented on a user device (e.g., user equipment devices 702, 704, and/or 706 (FIG. 7)). In addition, one or more steps of process 800 may be incorporated into or combined with one or more steps of any other process or embodiment described herein.

Process 800 begins at 805 where control circuitry 604 receives a command, at a media guidance application, from a user to store a first copy of a media asset from a first media source. For example, the control circuitry 604 receives a command to store season 6, episode 1 of "Game of Thrones" as made available by Comcast Cable as depicted in FIG. 1.

While the descriptions herein are made in reference to storing a copy of a media asset, one of skill in the art could apply the methods herein to other possible actions performed on media assets, e.g. videos, listed in a media guidance application. For example, the user may provide a command to initiate playback of a video from a video source. Or the user may initiate a command to auto-play a media asset at a later date and time. The methods described herein may, in response to commands to take action on media asset, determine that alternative sources for the media asset exist, in the manner described herein, and determine that an alternative source is appropriate for taking the action in lieu of the selected source based on DMR attributes and/or ad-load. Similarly, the techniques described here in make reference to determine attributes of copies of a media asset. In scenarios where a user is streaming a media asset from a remote server, it would be understood that the same techniques could apply to playback of the streamed media without making a copy of the media asset on a user device. For example, the DRM attributes could be obtained from the sources of the media asset without first obtaining a copy of the media asset.

Process 800 continues at 810, where control circuitry 604 generates a first digital rights management score associated with the user for the first copy of the media asset. For example, the control circuitry 604 may determine that, based on access restrictions placed on the user by the selected content provider, e.g., Comcast cable, for accessing a media asset, e.g., "Game of Thrones", the media asset has a DRM score of 125 which represents different values associated with a plurality of access restrictions for the purpose of comparing the access restrictions for restrictions placed on other copies of the media asset from other sources.

At step 815, the control circuitry 604 continues by determining that a plurality of alternative copies of the media asset are available from a plurality of alternative media sources to which the user subscribes, each of the plurality of alternative copies of the media asset comprising substantively similar content as the first copy of the media asset. For example, the control circuitry 604 may determine that an episode of a media asset, e.g., "Game of Thrones", provided by a content provider, e.g., Comcast cable, is also available from two streaming services, e.g., HBO Now and Amazon Prime.

Process 800 continues at 820, where control circuitry 604 generates a plurality of alternative digital rights management scores, each of the plurality of alternative digital rights management scores associated with the user for an alternative copy of the media asset from the plurality of alternative copies of the media asset for each of the plurality of alternative copies of the media asset. For example, the control circuitry 604 may determine that, based on access restrictions placed on the user by a first streaming service, e.g., HBO Now, for accessing the media asset, that copy of the media asset has a DRM score of 50. The control circuitry 604 may also determine that, based on access restrictions placed on the user by a second streaming service, e.g., Amazon Prime, for accessing the media asset, that copy of the media asset has a DRM score of 75.

At 825, process 800 continues with control circuitry 604 determining that one of the plurality of alternative digital rights management scores indicates a lower level of access restrictions associated with the user for an associated alternative copy of the media asset from the plurality of alternative copies of the media asset as compared to the first copy of the media asset. For example, the control circuitry 604 determines that the DRM score associated with first streaming service, e.g., 50, indicates fewer access restrictions than the DRM score for the same media asset from selected provider, e.g., 125.

Process 800 continues at 830, where the control circuitry 604 retrieves the associated alternative copy of the media asset from an associated alternative media source without receiving a command from the user to store the associated alternative copy of the media asset. For example, the control circuitry 604 retrieves the media asset from the first streaming service, e.g., season 6, episode 1 of "Game of Thrones" from HBO Now.

At 835, process 800 concludes by having the control circuitry 604 store the associated alternative copy of the media asset for access by the user instead of the first copy of the media asset. For example, the control circuitry 604 stores the media asset from the first streaming service, e.g., season 6, episode 1 of "Game of Thrones" from HBO Now, in a storage 608 of a user equipment.

Figure 9:
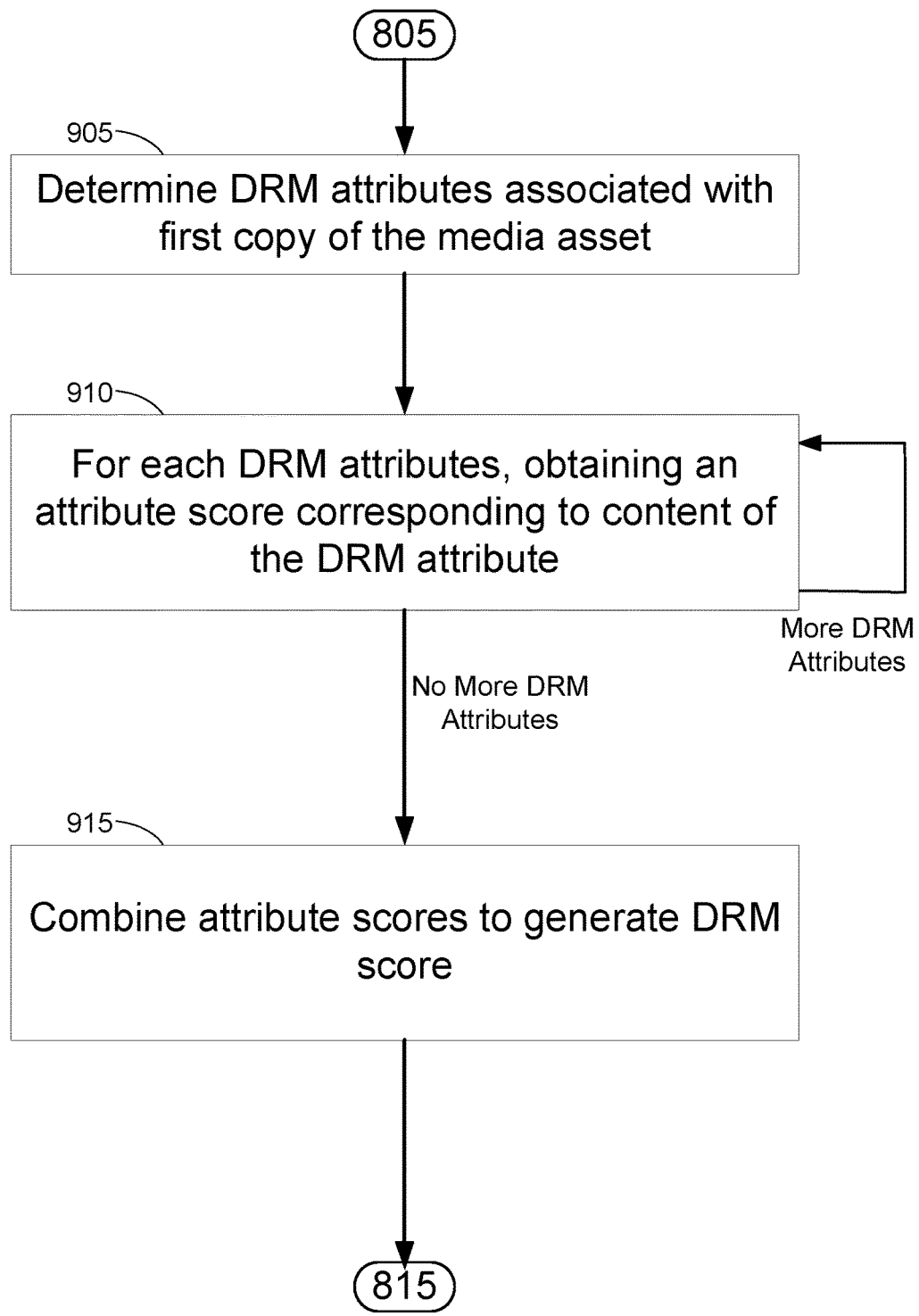
FIG. 9 depicts an illustrative flowchart of a process for generating a DRM score associated with a user for a copy of a media asset, in accordance with some embodiments of the disclosure.

FIG. 9 depicts an illustrative flowchart of a process for generating a DRM score associated with a user for a copy of a media asset, such as step 810 from FIG. 8, in accordance with some embodiments of the disclosure. It should be noted that process 900 or any step thereof could be performed on, or provided by, any of the devices shown in FIGS. 6-7. For example, process 810A may be executed by control circuitry 604 (FIG. 6) as instructed by a media guidance application implemented on a user device (e.g., user equipment devices 702, 704, and/or 706 (FIG. 7)). In addition, one or more steps of process 810A may be incorporated into or combined with one or more steps of any other process or embodiment described herein.

Process 810A begins after step 805 as described in FIG. 8. The control circuitry 604 determines a first plurality of digital rights management attributes associated with the first copy of the media asset that correspond with one or more access restrictions associated with the user for the first copy of the media asset. For example, the control circuitry 604 may determine that the selected provider, e.g., Comcast cable, places a DRM restriction on media assets for the user that prevents the user from watching shows in an off-line mode and prevents users from watching shows outside the United States.

At 910, process 810A continues by having control circuitry 604, for each of the first plurality of digital rights management attributes, obtain an attribute score corresponding to content of the digital rights management attribute. For example, the control circuitry 604 may determine DRM restrictions on media assets for the user that prevents the user from watching shows in an off-line mode are associated with a score of 75 and DRM restrictions on media assets for the user that prevent the user from watching shows outside the United States are associated with a score of 50.

Once all DRM scores are obtained for each of the DRM attributes, process 810A continues at 915 where control circuitry 604 combines the plurality of attribute scores to generate the first digital rights management score. For example, the control circuitry 604 may determine a DRM score of 125 for a media asset provided by Comcast cable. Process 810A continues at step 815 of FIG. 8 as previously described.

Figure 10:
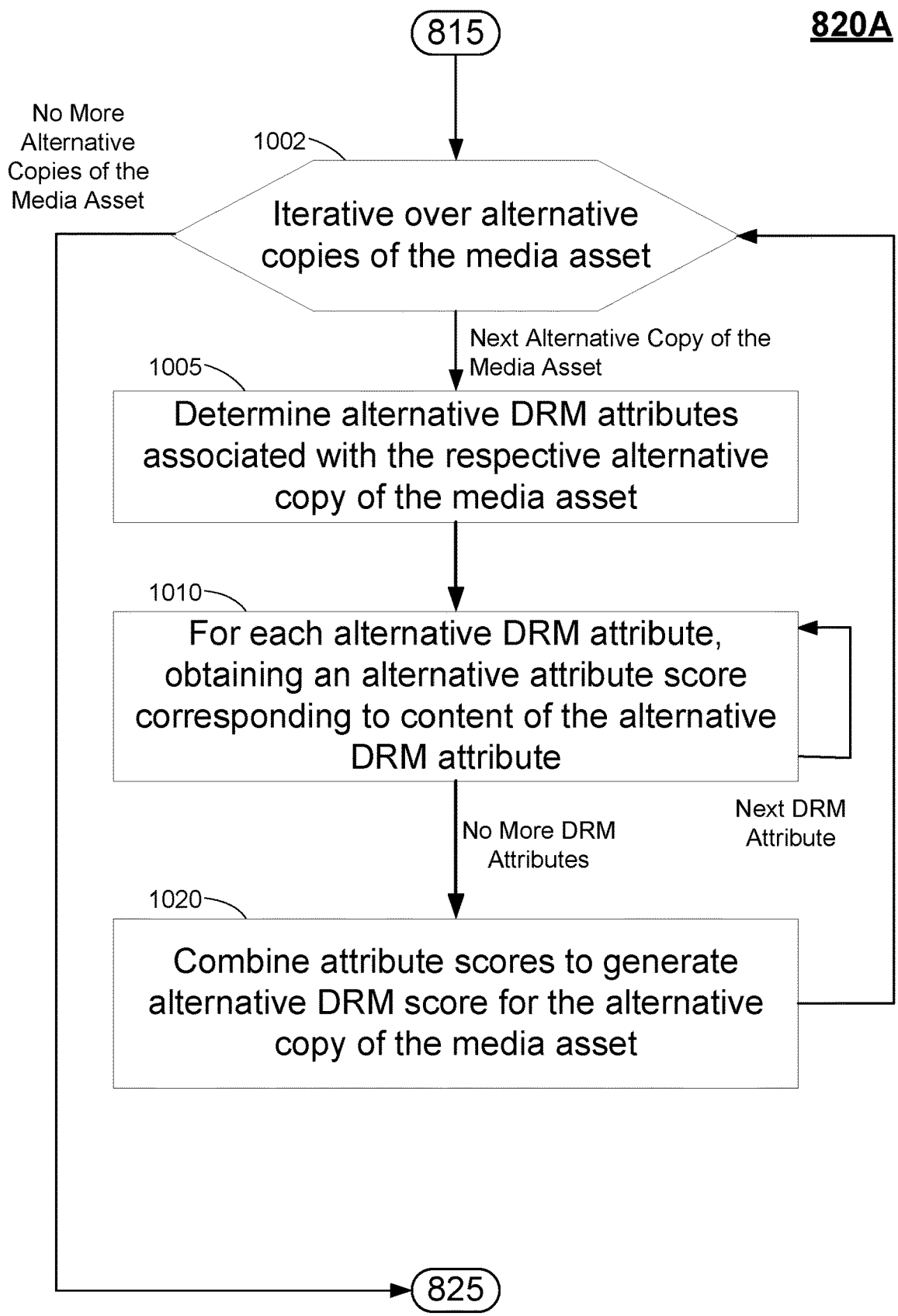
FIG. 10 depicts an illustrative flowchart of a process for generating alternative DRM scores associated with a user for alternative copies of a media asset, in accordance with some embodiments of the disclosure.

FIG. 10 depicts an illustrative flowchart of a process for generating alternative DRM scores associated with a user for alternative copies of a media asset, such as step 820 from FIG. 8, in accordance with some embodiments of the disclosure. It should be noted that process 820A or any step thereof could be performed on, or provided by, any of the devices shown in FIGS. 6-7. For example, process 820A may be executed by control circuitry 604 (FIG. 6) as instructed by a media guidance application implemented on a user device (e.g., user equipment devices 702, 704, and/or 706 (FIG. 7)). In addition, one or more steps of process 820A may be incorporated into or combined with one or more steps of any other process or embodiment described herein.

Process 820A begins after step 815 as described in FIG. 8. At step 1002, the control circuitry 604 iterates over the plurality of alternative copies of the media assets to determine an associated DRM score for each alternative copy. Once process 820A processes each of the alternative copies, the process continues at step 825 of FIG. 8. Process 820A determines a DRM score for an alternative copy of a media asset in a similar manner as described for the first copy of the media asset in FIG. 9.

For each of the alternative copies of the media asset, Process 810A continues after step 1002. At step 1005, the control circuitry 604 determines a plurality of alternative digital rights management attributes associated with the alternative copy of the media asset that correspond with one or more access restrictions associated with the user for the alternative copy of the media asset. At step 1010, process 820A continues where control circuitry 604, for each of the plurality of alternative digital rights management attributes, obtains an alternative attribute score corresponding to content of the alternative digital rights management attribute. Once all DRM scores are obtained for each of the DRM attributes, process 820A continues at 1020 where control circuitry 604 combines the plurality of alternative attribute scores to generate one of the plurality of alternative digital rights management scores.

Figure 11:
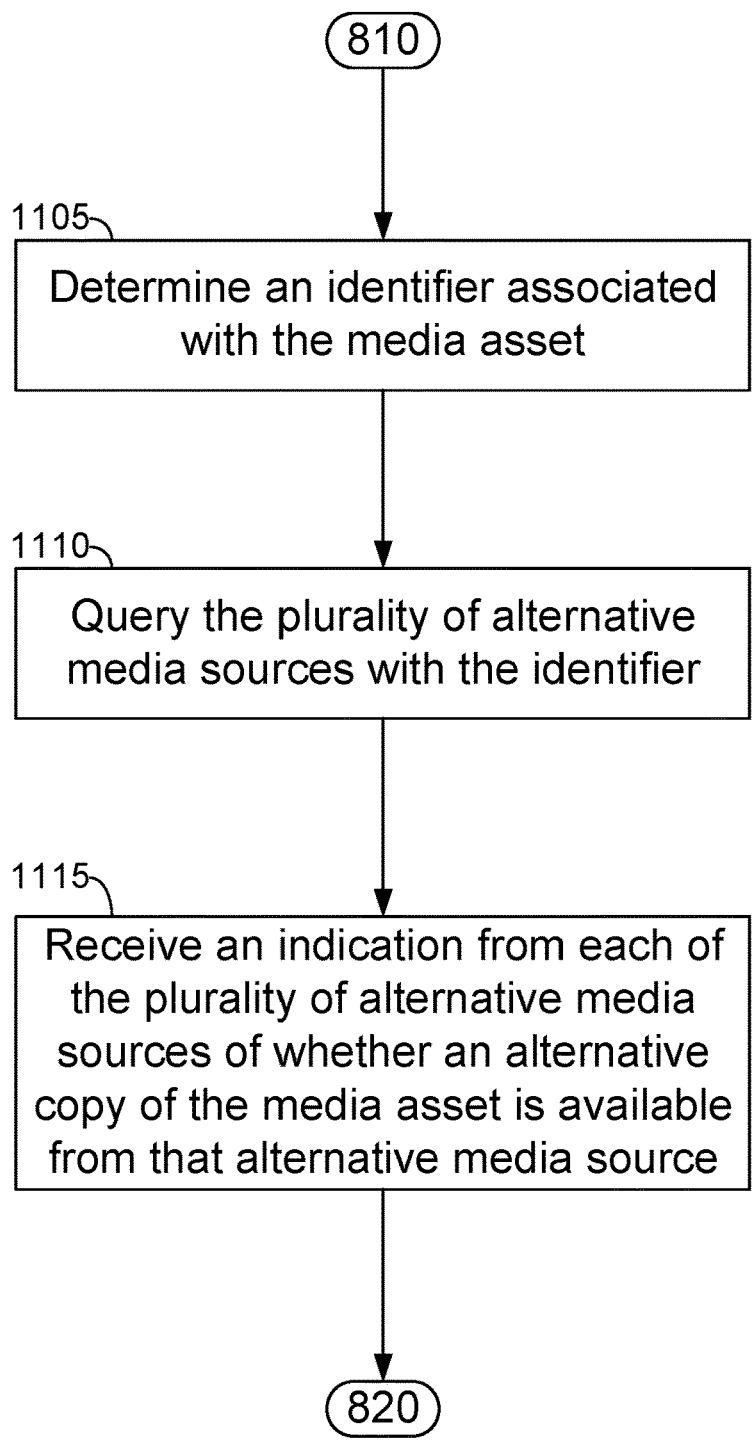
FIG. 11 depicts an illustrative flowchart of a process for determining whether alternative copies of a media asset are available from alternative media sources, in accordance with some embodiments of the disclosure.

FIG. 11 depicts an illustrative flowchart of a process for determining whether alternative copies of a media asset are available from alternative media sources, such as step 815A from FIG. 8, in accordance with some embodiments of the disclosure. It should be noted that process 815A or any step thereof could be performed on, or provided by, any of the devices shown in FIGS. 6-7. For example, process 815A may be executed by control circuitry 604 (FIG. 6) as instructed by a media guidance application implemented on a user device (e.g., user equipment devices 702, 704, and/or 706 (FIG. 7)). In addition, one or more steps of process 815A may be incorporated into or combined with one or more steps of any other process or embodiment described herein.

Process 815A begins after step 810 as described in FIG. 8. At step 1105, control circuitry 604 determines an identifier associated with the media asset. For example, the control circuitry 604 may access metadata of the media asset to obtain a globally unique identifier.

At 1110, the control circuitry 604, queries the plurality of alternative media sources with the identifier. For example, the control circuitry 604 may send a message to a web service associated with a streaming service to request information on whether the media asset is available to the user from the streaming service and may send another message to a web service of a second streaming service. In response to the queries sent at step 1110, the control circuitry 604 receives, at step 1115, an indication from each of the plurality of alternative media sources of whether an alternative copy of the media asset is available from that alternative media source. The process continues at step 820 of FIG. 8.

Figure 12:
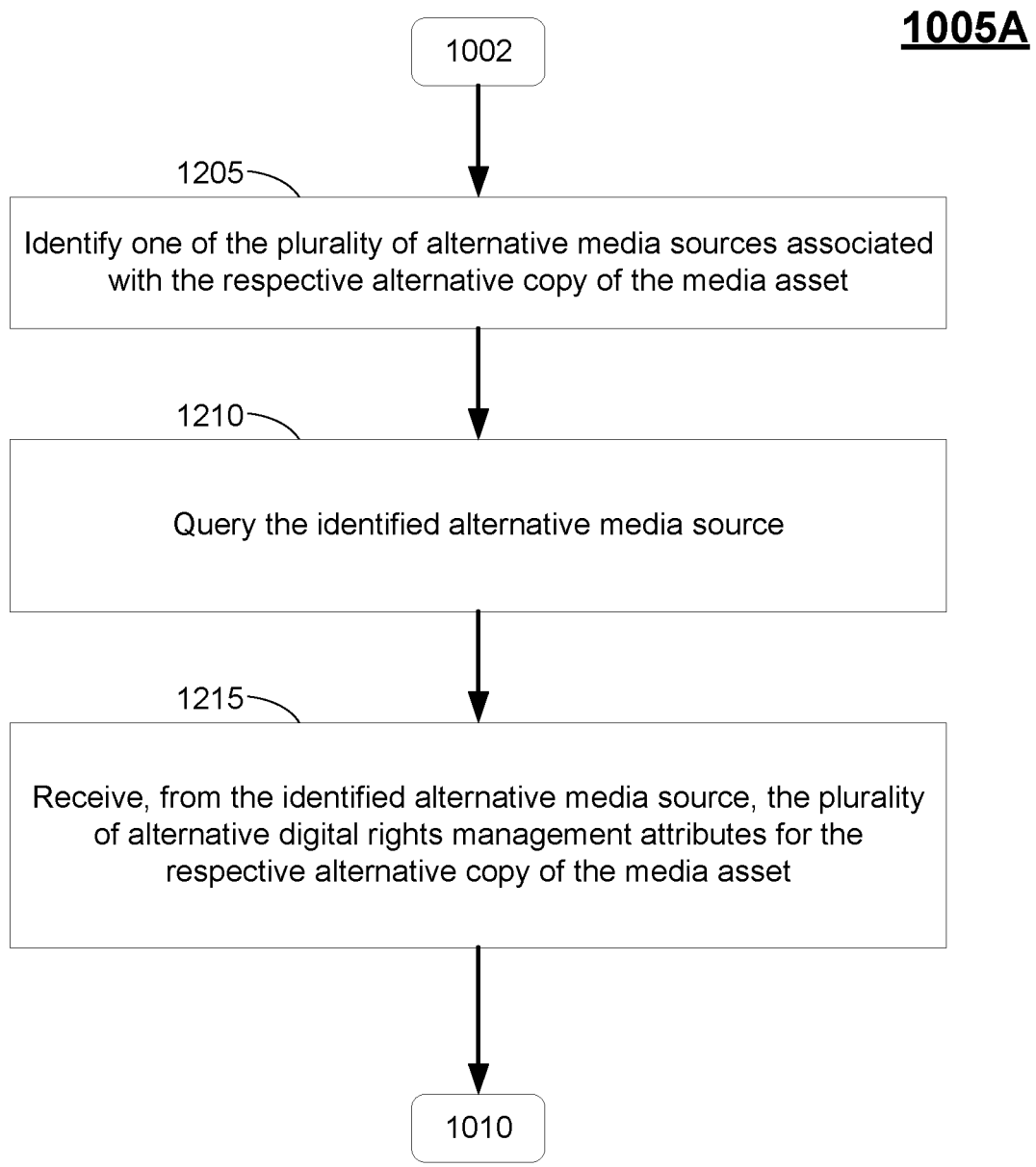
FIG. 12 depicts an illustrative flowchart of a process for determining alternative DRM attributes associated with an alternative copy of a media asset, in accordance with some embodiments of the disclosure.

FIG. 12 depicts an illustrative flowchart of a process for determining alternative DRM attributes associated with an alternative copy of a media asset, such as step 1005 from FIG. 10, in accordance with some embodiments of the disclosure. It should be noted that process 1005A or any step thereof could be performed on, or provided by, any of the devices shown in FIGS. 6-7. For example, process 1005A may be executed by control circuitry 604 (FIG. 6) as instructed by a media guidance application implemented on a user device (e.g., user equipment devices 702, 704, and/or 706 (FIG. 7)). In addition, one or more steps of process 1005A may be incorporated into or combined with one or more steps of any other process or embodiment described herein.

Process 1005A begins after step 1002 as described in FIG. 10. At step 1205, control circuitry 604 identifies one of the plurality of alternative media sources associated with the respective alternative copy of the media asset. For example, when processing the alternative copy of a media asset as provided by a streaming service, the control circuitry 604 identifies the media source as the streaming service.

Process 1005A continues at 1210, where the control circuitry 604 queries the identified alternative media source. For example, the control circuitry 604 sends a message to a web service for the streaming service to request DRM attributes for the user when accessing the media asset as provided by the streaming service.

At step 1215, the control circuitry 604 continues by receiving, from the identified alternative media source, the plurality of alternative digital rights management attributes for the respective alternative copy of the media asset. Process 1005A continues at step 1010 as described with reference to FIG. 10.

Figure 13:
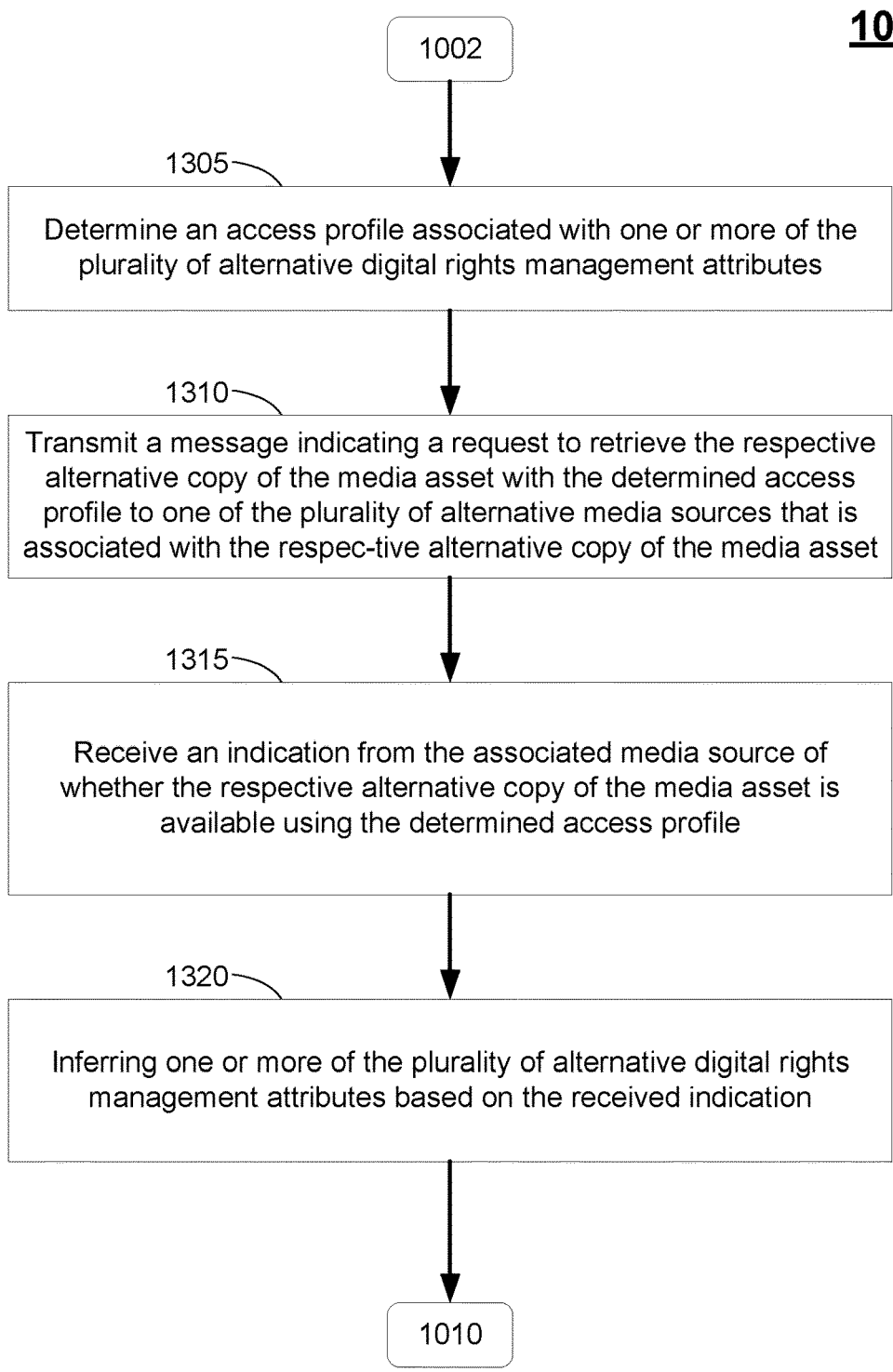
FIG. 13 depicts an illustrative flowchart of a process for determining alternative DRM attributes associated with an alternative copy of a media asset, in accordance with some embodiments of the disclosure.

FIG. 13 depicts an illustrative flowchart of a process for determining alternative DRM attributes associated with an alternative copy of a media asset, such as step 1005 from FIG. 10, in accordance with some embodiments of the disclosure. It should be noted that process 1005B or any step thereof could be performed on, or provided by, any of the devices shown in FIGS. 6-7. For example, process 1005B may be executed by control circuitry 604 (FIG. 6) as instructed by a media guidance application implemented on a user device (e.g., user equipment devices 702, 704, and/or 706 (FIG. 7)). In addition, one or more steps of process 1005B may be incorporated into or combined with one or more steps of any other process or embodiment described herein.

Process 1005B begins after step 1002 as described in FIG. 10. At step 1305, control circuitry 604 determines an access profile associated with one or more of the plurality of alternative digital rights management attributes. For example, the control circuitry 604 may determine to use an access profile associated with a geographic restriction DRM attribute that indicates access will be made from outside the United States.

Process 1005B continues at step 1310, where the control circuitry 604 transmits a message indicating a request to retrieve the respective alternative copy of the media asset with the determined access profile to one of the plurality of alternative media sources that is associated with the respective alternative copy of the media asset. For example, the control circuitry 604 sends a message to a streaming service that indicates the control circuitry 604 is requesting access to the media asset from outside the United States. In some embodiments, this type of message may not reflect the current access scenario but is instead meant to mimic, or imitate, an envisioned access scenario.

At step 1315, the control circuitry 604 receives an indication from the associated media source of whether the respective alternative copy of the media asset is available using the determined access profile. Process 1005B continues at step 1320, where the control circuitry 604 infers one or more of the plurality of alternative digital rights management attributes based on the received indication. For example, if the control circuitry 604 receives an indication that the media asset is not available from the streaming service after imitating an access from outside the United States, the control circuitry 604 may infer that the streaming service imposes access restrictions on media assets that prevent access outside the United States. Process 1005B continues at step 1010 as described with reference to FIG. 10.

Figure 14:
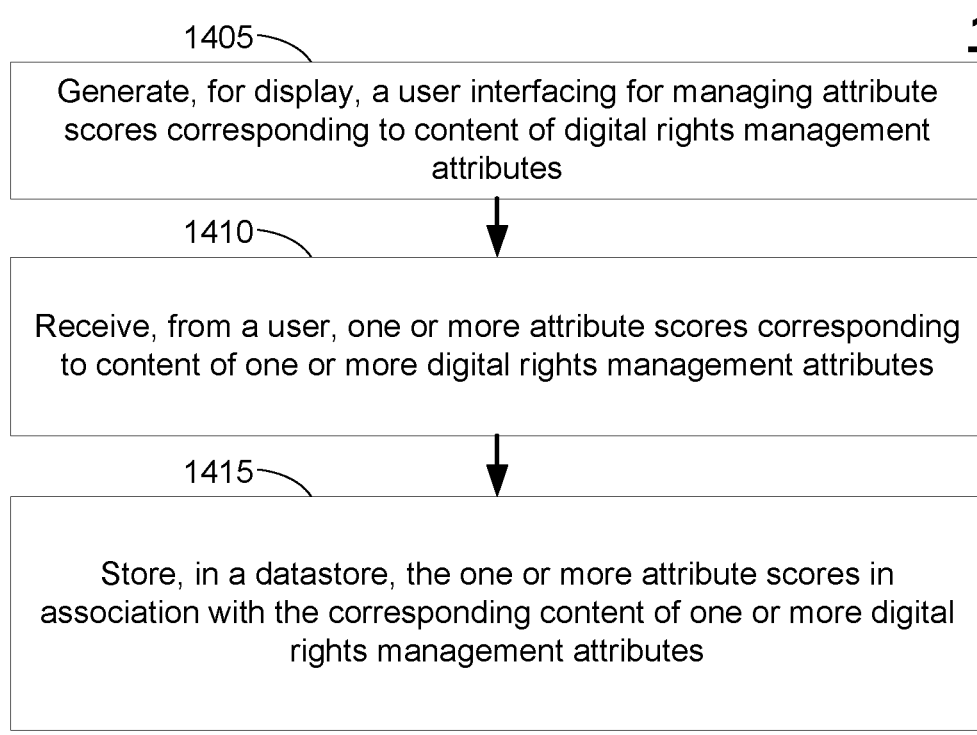
FIG. 14 depicts an illustrative flowchart of a process for managing attribute scores, in accordance with some embodiments of the disclosure.

FIG. 14 depicts an illustrative flowchart of a process for managing attribute scores, in accordance with some embodiments of the disclosure. It should be noted that process 1400 or any step thereof could be performed on, or provided by, any of the devices shown in FIGS. 6-7. For example, process 1400 may be executed by control circuitry 604 (FIG. 6) as instructed by a media guidance application implemented on a user device (e.g., user equipment devices 702, 704, and/or 706 (FIG. 7)). In addition, one or more steps of process 1400 may be incorporated into or combined with one or more steps of any other process or embodiment described herein.

Process 1400 begins at step 1405 where the control circuitry 604 generates, for display, a user interface for managing attribute scores corresponding to content of digital rights management attributes. For example, control circuitry 604 may generate a list of scores for different possible values of various DRM attributes and generate an interface element for modifying the scores of those values.

At step 1410, the control circuitry 604 receives, from a user, one or more attribute scores corresponding to content of one or more digital rights management attributes. The process 1400 concludes at step 1415 where the control circuitry 604 stores, in a datastore, the one or more attribute scores in association with the corresponding content of one or more digital rights management attributes. For example, the control circuitry 604 may receive input from a user indicating that a geographic restriction attribute limiting access to the United States should be associated with an attribute score of 0 and store that association for later retrieval when determining DRM scores in a manner as described above.

Figure 15:
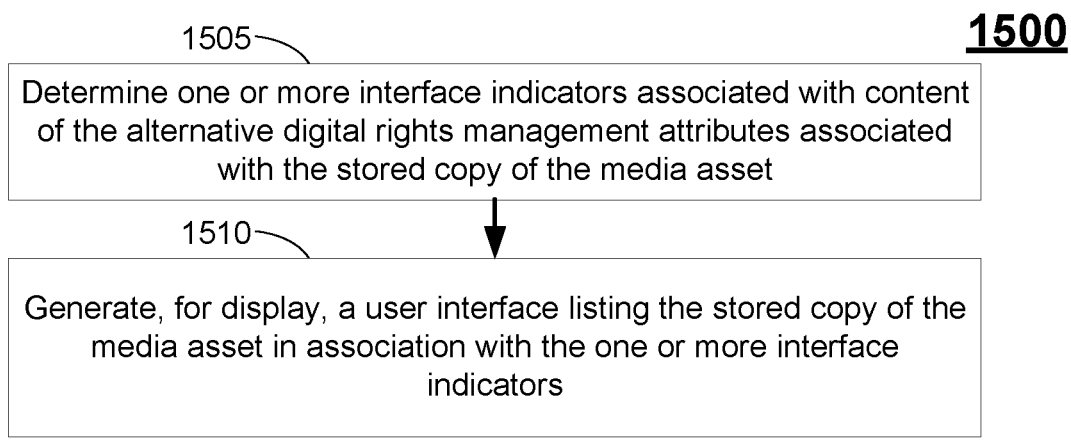
FIG. 15 depicts an illustrative flowchart of a process for generating indicators associated with DRM attributes for display along with a listing of a media asset, in accordance with some embodiments of the disclosure.

FIG. 15 depicts an illustrative flowchart of a process for generating indicators associated with DRM attributes for display along with a listing of a media asset, in accordance with some embodiments of the disclosure. It should be noted that process 1500 or any step thereof could be performed on, or provided by, any of the devices shown in FIGS. 6-7. For example, process 1500 may be executed by control circuitry 604 (FIG. 6) as instructed by a media guidance application implemented on a user device (e.g., user equipment devices 702, 704, and/or 706 (FIG. 7)). In addition, one or more steps of process 1500 may be incorporated into or combined with one or more steps of any other process or embodiment described herein.

Process 1500 begins at step 1505 where the control circuitry 604 determines one or more interface indicators associated with content of the alternative digital rights management attributes associated with the stored copy of the media asset. For example, the control circuitry 604 may determine that an indicator that media asset is restricted to the United States is associated with a stored copy of a media asset. At step 1510, control circuitry 604 generates, for display, a user interface listing the stored copy of the media asset in association with the one or more interface indicators. For example, the control circuitry 604 may generate a small icon of a map of the United States for displaying in an interface, e.g., interface 300 of FIG. 3, in association with the media asset.

Figure 16:
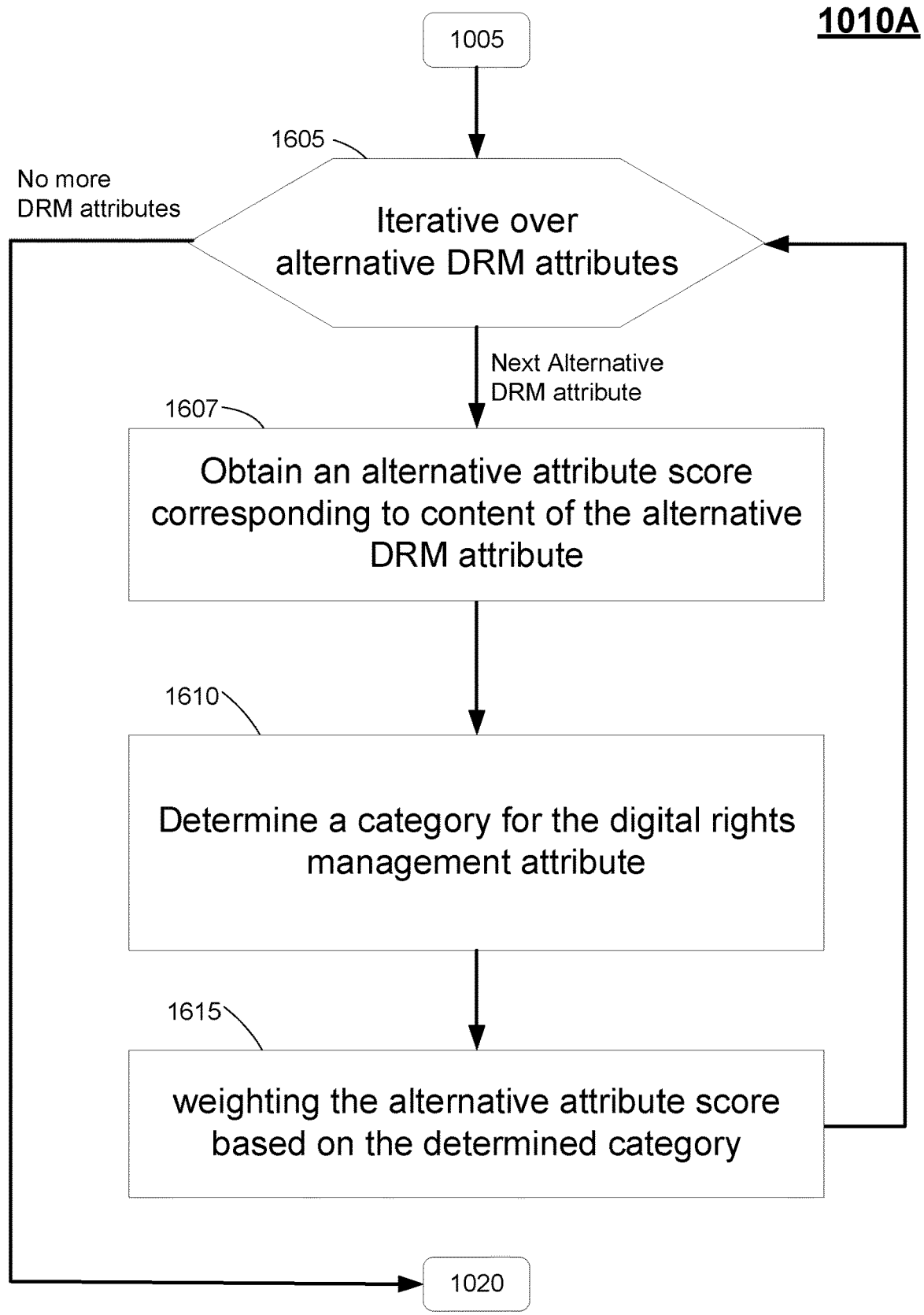
FIG. 16 depicts an illustrative flowchart of a process for obtaining alternative attribute scores corresponding to alternative DRM attributes, in accordance with some embodiments of the disclosure.

FIG. 16 depicts an illustrative flowchart of a process for obtaining alternative attribute scores corresponding to alternative DRM attributes, such as step 1010 of FIG. 10, in accordance with some embodiments of the disclosure. It should be noted that process 1010A or any step thereof could be performed on, or provided by, any of the devices shown in FIGS. 6-7. For example, process 1010A may be executed by control circuitry 604 (FIG. 6) as instructed by a media guidance application implemented on a user device (e.g., user equipment devices 702, 704, and/or 706 (FIG. 7)). In addition, one or more steps of process 1010A may be incorporated into or combined with one or more steps of any other process or embodiment described herein.

Process 1010A begins after step 1005 as described in FIG. 10. At step 1605, the control circuitry 604 iterates over the plurality of alternative DRM attributes of each respective alternative copy. Once process 1010A processes each of the alternative DRM attributes, the process continues at step 1020 of FIG. 10.

For each of the alternative DRM attributes, Process 1010A continues after step 1605. At step 1607, the control circuitry 604 obtains an alternative attribute score corresponding to content of the alternative DRM attribute. At step 1610, the control circuitry 604 determines a category for the digital rights management attribute. For example, the DRM attribute may be an advertising related attribute, a network related attribute, or a playback related attribute. Still other categories of attributes may exist, for example, time related attribute.

At step 1615, process 1010A continues, where the control circuitry 604 weights the alternative attribute score based on the determined category such that playback-related attributes are associated with a weight greater than one or more weights associated with advertising-related attributes. The media guidance application may determine a weight to apply to the attribute score based on its determined category. For example, the media guidance application may determine that a DRM attribute that limits playback to specific devices is given a greater weight than a DRM attribute of whether a user may skip advertisements.

Figure 17:
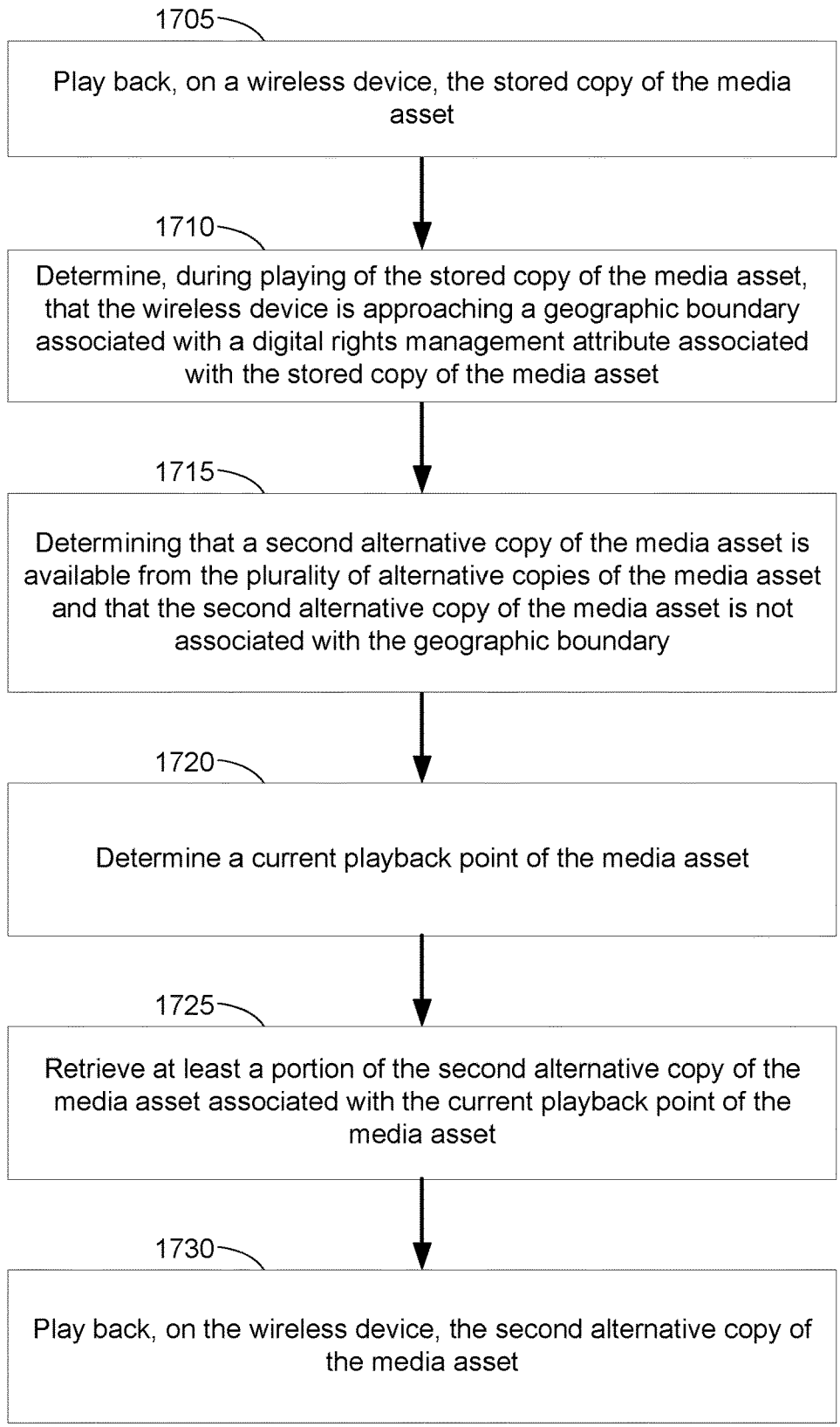
FIG. 17 depicts an illustrative flowchart of a process for playing a second alternative copy of a media asset in response to a geographic boundary on a first alternative copy of a media asset, in accordance with some embodiments of the disclosure.

FIG. 17 depicts an illustrative flowchart of a process for playing a second alternative copy of a media asset in response to a geographic boundary on a first alternative copy of a media asset, in accordance with some embodiments of the disclosure. It should be noted that process 1700 or any step thereof could be performed on, or provided by, any of the devices shown in FIGS. 6-7. For example, process 1700 may be executed by control circuitry 604 (FIG. 6) as instructed by a media guidance application implemented on a user device (e.g., user equipment devices 702, 704, and/or 706 (FIG. 7)). In addition, one or more steps of process 1700 may be incorporated into or combined with one or more steps of any other process or embodiment described herein.

Process 1700 begins at 1705, where the control circuitry 604 plays back, on a wireless device, the stored copy of the media asset. For example, a user may select to play back a media asset from a media guidance application by invoking a user interface element, e.g., playback interface element 325 from FIG. 3, on a portable playback device such as a tablet device.

At step 1710, the control circuitry 604 determines, during playing of the stored copy of the media asset, that the wireless device is approaching a geographic boundary associated with a digital rights management attribute associated with the stored copy of the media asset. For example, a user may play back a media asset while travelling near a geographic boundary, i.e., a geofence, where access restrictions on the media asset will prevent playback of the media asset when the user crosses the boundary. For example, in FIG. 3, the selected media asset, season 6, episode 1 of "Game of Thrones", is limited to playback in the United States, as indicated by DRM indicator 335. From time to time, a user may decide to play back such a media asset while traveling, perhaps on train, in a car, or by plane, on a trip from inside the United States to outside the United States. Thus, a user may initiate playback, e.g., by invoking playback interface element 325 while inside the United States, where the DRM restriction does not prevent playback. As the user approaches the geographic boundary, the control circuitry 604 can infer that the user will lose access to the continued playback.

Process 1700 continues at 1715, where the control circuitry 604 determines that a second alternative copy of the media asset is available from the plurality of alternative copies of the media asset and that the second alternative copy of the media asset is not associated with the geographic boundary. Continuing the example above, the control circuitry may use the techniques described above to locate a copy of the media asset from an alternative source, e.g., another service provider such as Comcast cable or Amazon Prime, as depicted in FIG. 2.

At 1720, the control circuitry 604 determines a current playback point of the media asset. For example, the user may be 32 minutes into playback of a media asset, such as an episode of "Game of Thrones". Therefore, continuing playback of the media asset, whether or not from another copy of the media asset, would mean picking up playback at the 32-minute mark.

Process 1700 continues at step 1725 with the control circuitry 604 retrieving at least a portion of the second alternative copy of the media asset associated with the current playback point of the media asset. Continuing the example above, control circuitry 604 can continue playback of the media asset by retrieving portions of the media asset after the 32-minute mark, i.e., the un-played portion of the media asset. This would allow the control circuitry to continue playback without expending unnecessary communication resources by retrieving already watched portions of the media asset. In some embodiments, the control circuitry may instead retrieve all of the media asset starting from the beginning and continue playback by skipping ahead in the media asset.

At step 1730, process 1700 concludes by having the control circuitry 604 play back, on the wireless device, the second alternative copy of the media asset.

Figure 18:
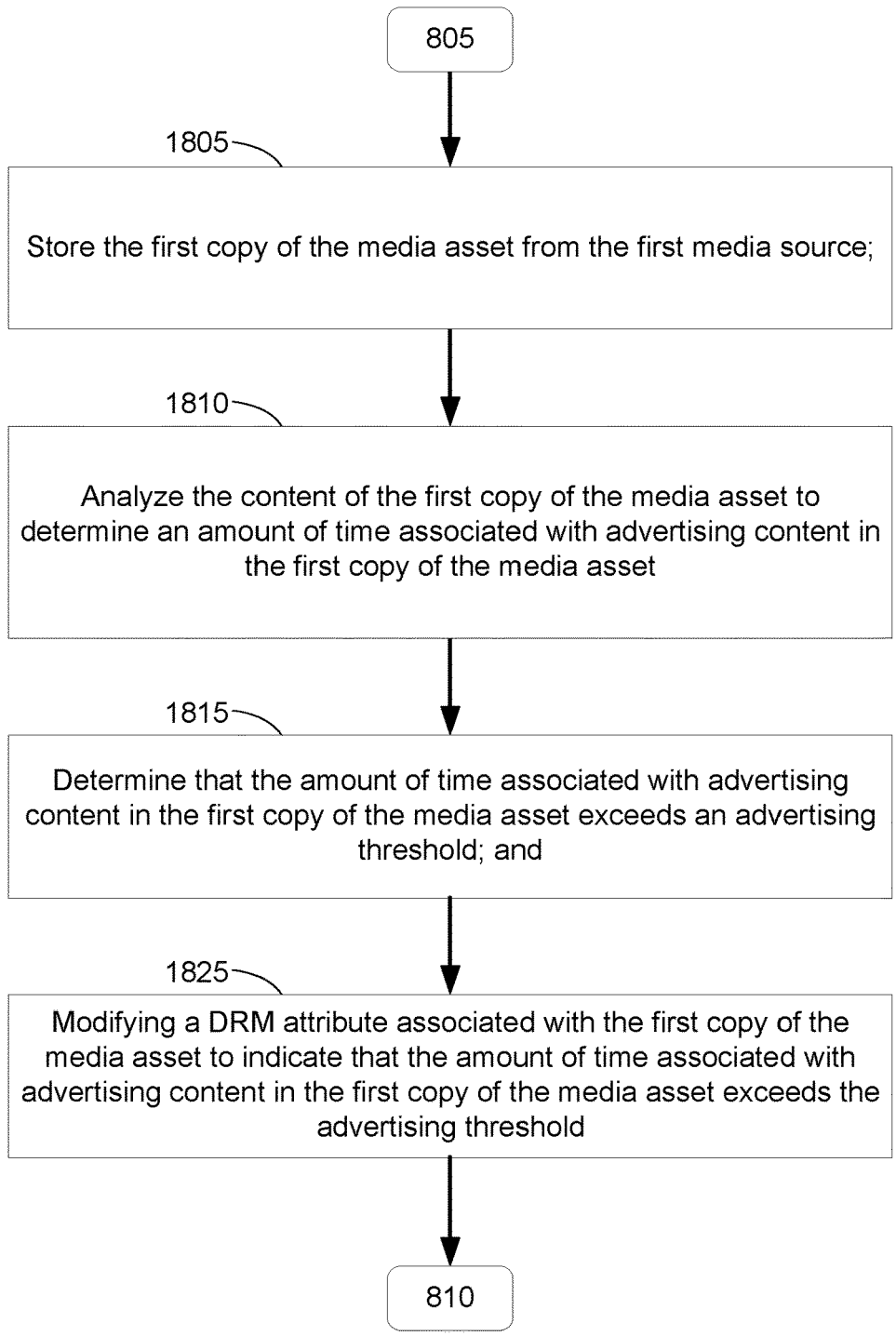
FIG. 18 depicts an illustrative flowchart of a process for adjusting DRM attributes based on the presence of advertising content in a copy of a media asset, in accordance with some embodiments of the disclosure.

FIG. 18 depicts an illustrative flowchart of a process for adjusting DRM attributes based on the presence of advertising content in a copy of a media asset, in accordance with some embodiments of the disclosure. It should be noted that process 1800 or any step thereof could be performed on, or provided by, any of the devices shown in FIGS. 6-7. For example, process 1800 may be executed by control circuitry 604 (FIG. 6) as instructed by a media guidance application implemented on a user device (e.g., user equipment devices 702, 704, and/or 706 (FIG. 7)). In addition, one or more steps of process 1800 may be incorporated into or combined with one or more steps of any other process or embodiment described herein.

Process 1800 begins after step 805 of FIG. 8. At step 1805, the control circuitry 604 stores the first copy of the media asset from the first media source. For example, a user may select a media asset for storage from a first media source, e.g., season 6, episode 1 of "Game of Thrones" from Comcast cable, as depicted in FIG. 1. In response, the control circuitry 604 may retrieve that media asset from the selected source, e.g., Comcast cable, and save the media asset for processing.

At step 1810, the control circuitry 604 continues process 1800 by analyzing the content of the first copy of the media asset to determine an amount of time associated with advertising content in the first copy of the media asset. For example, control circuitry 604 may determine that 15 minutes of a media asset are detected as commercials. For example, the control circuitry 604 may use identify vertical blanking as the start and end of a commercial and measure all the time between different commercial breaks, or the control circuitry 604 may access metadata that tracks the amount of time spent on advertising.

Process 1800 continues at step 1815, where the control circuitry 604 determines that the amount of time associated with advertising content in the first copy of the media asset exceeds an advertising threshold. For example, the control circuitry 604 may obtain an advertising threshold that indicates that 10 minutes of advertising in 60-minute media asset is excessive. In some embodiments, the advertising threshold may be expressed in terms of time, e.g., seconds, minutes, hours. In some embodiments, the advertising threshold may be expressed in terms of percentage of content, e.g., 2%.

At step 1825, control circuitry 604 continues process 1800 by modifying one of the plurality of digital rights management attributes associated with the first copy of the media asset to indicate that the amount of time associated with advertising content in the first copy of the media asset exceeds the advertising threshold. For example, the media asset as provided by a content provider, e.g., Comcast cable, may have existing DRM restrictions that prevent playback on certain devices or prevent off-line playback. The control circuitry may save an indication of the time in the media asset devoted to advertising as an additional attribute to be considered when making a determination of whether to save an alternative copy of the media asset such as in the manner described above, e.g., with reference to FIG. 8.

Process 1800 concludes at step 810 as described with reference to FIG. 8.

Figure 19:
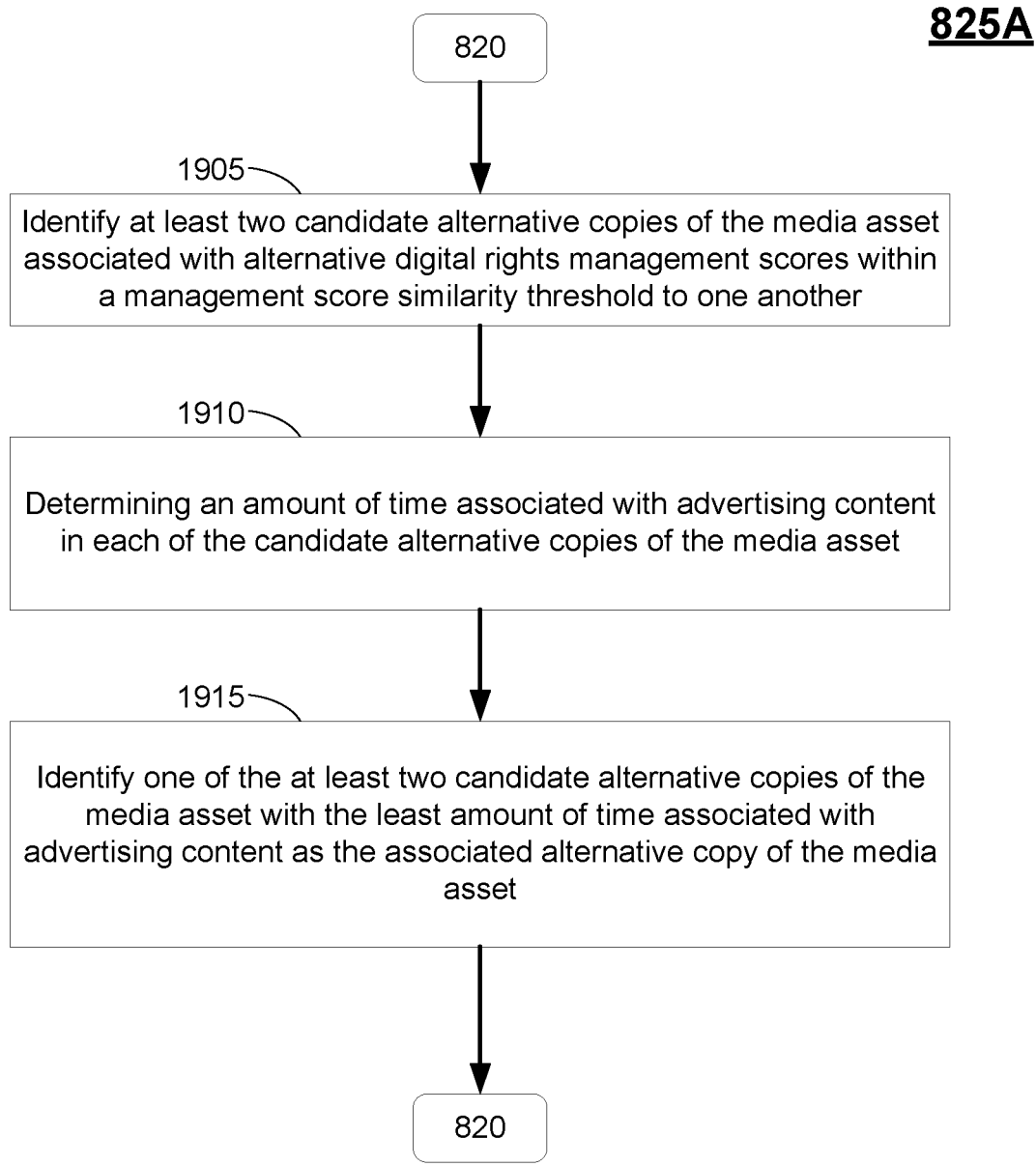
FIG. 19 depicts an illustrative flowchart of a process for determining that one of the plurality of alternative digital rights management scores indicates a lower level of access restriction, in accordance with some embodiments of the disclosure.

FIG. 19 depicts an illustrative flowchart of a process for determining that one of the plurality of alternative digital rights management scores indicates a lower level of access restriction, such as step 827 of FIG. 8, in accordance with some embodiments of the disclosure. It should be noted that process 1900 or any step thereof could be performed on, or provided by, any of the devices shown in FIGS. 6-7. For example, process 1900 may be executed by control circuitry 604 (FIG. 6) as instructed by a media guidance application implemented on a user device (e.g., user equipment devices 702, 704, and/or 706 (FIG. 7)). In addition, one or more steps of process 1900 may be incorporated into or combined with one or more steps of any other process or embodiment described herein.

Process 1900 begins after step 820 of FIG. 8. At step 1905, the control circuitry 604 identifies at least two candidate alternative copies of the media asset associated with alternative digital rights management scores within a management score similarity threshold of one another. For example, a user may invoke a command to save a media asset from a first provider, e.g., season 6, episode 1 of "Game of Thrones" as provided by Comcast cable. The control circuitry, through a process as described above, may determine that the media asset is available from two alternative sources, e.g., a first streaming service and second streaming service. The control circuitry 604 may also determine that the level of access restrictions on the media asset from the two services are close enough to consider the difference insignificant, i.e., the differences are within a similarity threshold. For example, the DRM scores of the media assets from the two alternative sources may be 50 and 55, and the control circuitry 604 may have a similarity threshold of 10. In some embodiments, the similarity threshold may be a numerical difference, a percentage, or a qualitative threshold.

At step 1910, the control circuitry 604 continues process 1900 by determining an amount of time associated with advertising content in each of the candidate alternative copies of the media asset. For example, control circuitry 604 may determine an amount of time associated with advertising content in each of the candidate alternative copies of the media asset. For example, the media guidance application may determine that a show from the first streaming service contains 2 minutes of advertising while the same show from second streaming service contains 4 minutes of advertising.

At step 1915, the control circuitry 604 identifies one of the at least two candidate alternative copies of the media asset with the least amount of time associated with advertising content as the associated alternative copy of the media asset. For example, the control circuitry 604 may then identify the candidate alternative copy of the media asset from the first streaming service as having less time associated with advertising content and continue at step 820 of FIG. 8 by retrieving and storing the alternative copy of the media asset that has the preferred access restrictions and least advertisements.

It is contemplated that the steps or descriptions of each of FIGS. 8-19 may be used with any other embodiment of this disclosure. In addition, the steps and descriptions described in relation to FIGS. 8-19 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices, equipment, and interfaces discussed in relation to FIGS. 1-3 and 6-7 could be used to perform one or more of the steps in FIGS. 8-19.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 606 of FIG. 6. The processing circuitry, for instance, may be a general purpose processor, a customized integrated circuit (e.g., an ASIC), or a field-programmable gate array (FPGA) within user equipment 60, media content source 716, or media guidance data source 718. For example, a profile, as described herein, may be stored in, and retrieved from, storage 608 of FIG. 6, or media guidance data source 718 of FIG. 7. Furthermore, processing circuitry, or a computer program, may update settings of user equipment stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for storing media assets available from multiple media sources based on digital rights management restrictions, the method comprising:
  receiving a command, at a media guidance application, from a user to store, in memory, a first copy of a media asset from a first media source;
  generating a first digital rights management score associated with the user for the first copy of the media asset by:
    determining a first plurality of digital rights management attributes associated with the first copy of the media asset that correspond with one or more access restrictions associated with the user for the first copy of the media asset;
    for each of the first plurality of digital rights management attributes, obtaining an attribute score corresponding to content of the digital rights management attribute; and
    combining the plurality of attribute scores to generate the first digital rights management score;
  determining that a plurality of alternative copies of the media asset are available from a plurality of alternative media sources to which the user subscribes, each of the plurality of alternative copies of the media asset comprising substantively similar content as the first copy of the media asset;
  generating a plurality of alternative digital rights management scores, each of the plurality of alternative digital rights management scores associated with the user for an alternative copy of the media asset from the plurality of alternative copies of the media asset by, for each of the plurality of alternative copies of the media asset:
    determining a plurality of alternative digital rights management attributes associated with the alternative copy of the media asset that correspond with one or more access restrictions associated with the user for the alternative copy of the media asset;
    for each of the plurality of alternative digital rights management attributes, obtaining an alternative attribute score corresponding to content of the alternative digital rights management attribute; and
    combining the plurality of alternative attribute scores to generate one of the plurality of alternative digital rights management scores;
  determining that one of the plurality of alternative digital rights management scores indicates a lower level of access restrictions associated with the user for an associated alternative copy of the media asset from the plurality of alternative copies of the media asset as compared to the first copy of the media asset;
  retrieving the associated alternative copy of the media asset from an associated alternative media source without receiving a command from the user to store the associated alternative copy of the media asset;
  storing, in the memory using storage circuitry, the associated alternative copy of the media asset for access by the user instead of the first copy of the media asset; and
  generating for display the associated alternative copy of the media asset.

2. The method of claim 1, wherein determining that the plurality of alternative copies of the media asset are available from the plurality of alternative media sources to which the user subscribes further comprises:
  determining an identifier associated with the media asset;
  querying the plurality of alternative media sources with the identifier; and
  receiving an indication from each of the plurality of alternative media sources of whether an alternative copy of the media asset is available from that alternative media source.

3. The method of claim 1, wherein determining the plurality of alternative digital rights management attributes for each of the plurality of alternative copies of the media asset further comprises:
  identifying one of the plurality of alternative media sources associated with the respective alternative copy of the media asset;
  querying the identified alternative media source; and
  receiving, from the identified alternative media source, the plurality of alternative digital rights management attributes for the respective alternative copy of the media asset.

4. The method of claim 1, wherein determining the plurality of alternative digital rights management attributes for each of the plurality of alternative copies of the media asset further comprises:
  determining an access profile associated with one or more of the plurality of alternative digital rights management attributes;
  transmitting a message indicating a request to retrieve the respective alternative copy of the media asset with the determined access profile to one of the plurality of alternative media sources that is associated with the respective alternative copy of the media asset;
  receiving an indication from the associated media source of whether the respective alternative copy of the media asset is available using the determined access profile; and
  inferring one or more of the plurality of alternative digital rights management attributes based on the received indication.

5. The method of claim 1, further comprising:
  generating, for display, a user interface for managing attribute scores corresponding to content of digital rights management attributes;
  receiving, from a user, one or more attribute scores corresponding to content of one or more digital rights management attributes; and
  storing, in a datastore, the one or more attribute scores in association with the corresponding content of one or more digital rights management attributes.

6. The method of claim 1, further comprising:
  determining one or more interface indicators associated with content of the alternative digital rights management attributes associated with the stored copy of the media asset; and
  generating, for display, a user interface listing the stored copy of the media asset in association with the one or more interface indicators.

7. The method of claim 1, wherein obtaining the alternative attribute score corresponding to content of the alternative digital rights management attribute further comprises:
  determining a category for the digital rights management attribute as one of a group comprising advertising-related attributes, network-related attributes, and playback-related attributes; and
  weighting the alternative attribute score based on the determined category such that playback-related attributes are associated with a weight greater than one or more weights associated with advertising-related attributes.

8. The method of claim 1, further comprising:
playing back, on a wireless device, the stored copy of the media asset;
determining, during playing of the stored copy of the media asset, that the wireless device is approaching a geographic boundary associated with a digital rights management attribute associated with the stored copy of the media asset;
determining that a second alternative copy of the media asset is available from the plurality of alternative copies of the media asset and that the second alternative copy of the media asset is not associated with the geographic boundary;
determining a current playback point of the media asset;
retrieving at least a portion of the second alternative copy of the media asset associated with the current playback point of the media asset; and
playing back, on the wireless device, the second alternative copy of the media asset.

9. The method of claim 1, further comprises:
storing the first copy of the media asset from the first media source;
analyzing the content of the first copy of the media asset to determine an amount of time associated with advertising content in the first copy of the media asset;
determining that the amount of time associated with advertising content in the first copy of the media asset exceeds an advertising threshold; and
modifying one of the plurality of digital rights management attributes associated with the first copy of the media asset to indicate that the amount of time associated with advertising content in the first copy of the media asset exceeds the advertising threshold.

10. The method of claim 1, wherein determining that one of the plurality of alternative digital rights management scores indicates the lower level of access restrictions associated with the user for the associated alternative copy of the media asset from the plurality of alternative copies of the media asset as compared to the first copy of the media asset further comprises:
identifying at least two candidate alternative copies of the media asset associated with alternative digital rights management scores within a management score similarity threshold to one another;
determining an amount of time associated with advertising content in each of the candidate alternative copies of the media asset; and
identifying one of the at least two candidate alternative copies of the media asset with the least amount of time associated with advertising content as the associated alternative copy of the media asset.

11. A system for storing media assets available from multiple media sources based on digital rights management restrictions, the system comprising:
control circuitry configured to:
receive a command from a user to store, in memory, a first copy of a media asset from a first media source;
generate a first digital rights management score associated with the user for the first copy of the media asset by:
determining a first plurality of digital rights management attributes associated with the first copy of the media asset that correspond with one or more access restrictions associated with the user for the first copy of the media asset;
for each of the first plurality of digital rights management attributes, obtaining an attribute score corresponding to content of the digital rights management attribute; and
combining the plurality of attribute scores to generate the first digital rights management score;
determine that a plurality of alternative copies of the media asset are available from a plurality of alternative media sources to which the user subscribes, each of the plurality of alternative copies of the media asset comprising substantively similar content as the first copy of the media asset;
generate a plurality of alternative digital rights management scores, each of the plurality of alternative digital rights management scores associated with the user for an alternative copy of the media asset from the plurality of alternative copies of the media asset by, for each of the plurality of alternative copies of the media asset:
determining a plurality of alternative digital rights management attributes associated with the alternative copy of the media asset that correspond with one or more access restrictions associated with the user for the alternative copy of the media asset;
for each of the plurality of alternative digital rights management attributes, obtaining an alternative attribute score corresponding to content of the alternative digital rights management attribute; and
combining the plurality of alternative attribute scores to generate one of the plurality of alternative digital rights management scores;
determine that one of the plurality of alternative digital rights management scores indicates a lower level of access restrictions associated with the user for an associated alternative copy of the media asset from the plurality of alternative copies of the media asset as compared to the first copy of the media asset;
communication circuitry configured to:
retrieve the associated alternative copy of the media asset from an associated alternative media source without receiving a command from the user to store the associated alternative copy of the media asset; and
storage circuitry configured to:
store, in the memory, the associated alternative copy of the media asset for access by the user instead of the first copy of the media asset; and
wherein the control circuitry is further configured to generate for display the stored associated alternative copy.

12. The system of claim 11, wherein the control circuitry is further configured to determine that the plurality of alternative copies of the media asset are available from the plurality of alternative media sources to which the user subscribes by:
determining an identifier associated with the media asset;
querying the plurality of alternative media sources with the identifier; and
receiving an indication from each of the plurality of alternative media sources of whether an alternative copy of the media asset is available from that alternative media source.

13. The system of claim 11, wherein the control circuitry is further configured to determine the plurality of alternative digital rights management attributes for each of the plurality of alternative copies of the media asset by:
  identifying one of the plurality of alternative media sources associated with the respective alternative copy of the media asset;
  querying the identified alternative media source; and
  receiving, from the identified alternative media source, the plurality of alternative digital rights management attributes for the respective alternative copy of the media asset.

14. The system of claim 11, wherein the control circuitry is further configured to determine the plurality of alternative digital rights management attributes for each of the plurality of alternative copies of the media asset by:
  determining an access profile associated with one or more of the plurality of alternative digital rights management attributes;
  transmitting a message indicating a request to retrieve the respective alternative copy of the media asset with the determined access profile to one of the plurality of alternative media sources that is associated with the respective alternative copy of the media asset;
  receiving an indication from the associated media source of whether the respective alternative copy of the media asset is available using the determined access profile; and
  inferring one or more of the plurality of alternative digital rights management attributes based on the received indication.

15. The system of claim 11, wherein:
  the control circuitry is further configured to:
    generate, for display, a user interface for managing attribute scores corresponding to content of digital rights management attributes;
    receive, from a user, one or more attribute scores corresponding to content of one or more digital rights management attributes; and
  the storage circuitry is further configured to:
    store the one or more attribute scores in association with the corresponding content of one or more digital rights management attributes.

16. The system of claim 11, wherein the control circuitry is further configured to:
  determine one or more interface indicators associated with content of the alternative digital rights management attributes associated with the stored copy of the media asset; and
  generate, for display, a user interface listing the stored copy of the media asset in association with the one or more interface indicators.

17. The system of claim 11, wherein the control circuitry is further configured to obtain the alternative attribute score corresponding to content of the alternative digital rights management attribute by:
  determining a category for the digital rights management attribute as one of a group comprising advertising-related attributes, network-related attributes, and playback-related attributes; and
  weighting the alternative attribute score based on the determined category such that playback-related attributes are associated with a weight greater than one or more weights associated with advertising-related attributes.

18. The system of claim 11, wherein:
  the control circuitry is further configured to:
    play back, on a wireless device, the stored copy of the media asset;
    determine, during playing of the stored copy of the media asset, that the wireless device is approaching a geographic boundary associated with a digital rights management attribute associated with the stored copy of the media asset;
    determine that a second alternative copy of the media asset is available from the plurality of alternative copies of the media asset and that the second alternative copy of the media asset is not associated with the geographic boundary;
    determine a current playback point of the media asset; and
  the communication circuitry is further configured to:
    retrieve at least a portion of the second alternative copy of the media asset associated with the current playback point of the media asset to allow the control circuitry to continue playback of the media asset with the second alternative copy of the media asset.

19. The system of claim 11, wherein the control circuitry is further configured to:
  store the first copy of the media asset from the first media source;
  analyze the content of the first copy of the media asset to determine an amount of time associated with advertising content in the first copy of the media asset;
  determine that the amount of time associated with advertising content in the first copy of the media asset exceeds an advertising threshold; and
  modify one of the plurality of digital rights management attributes associated with the first copy of the media asset to indicate that the amount of time associated with advertising content in the first copy of the media asset exceeds the advertising threshold.

20. The system of claim 11, wherein the control circuitry is further configured to determine that one of the plurality of alternative digital rights management scores indicates the lower level of access restrictions associated with the user for the associated alternative copy of the media asset from the plurality of alternative copies of the media asset as compared to the first copy of the media asset by:
  identifying at least two candidate alternative copies of the media asset associated with alternative digital rights management scores within a management score similarity threshold to one another;
  determining an amount of time associated with advertising content in each of the candidate alternative copies of the media asset; and
  identifying one of the at least two candidate alternative copies of the media asset with the least amount of time associated with advertising content as the associated alternative copy of the media asset.

* * * * *